United States Patent
Lucente et al.

(10) Patent No.: US 12,553,822 B2
(45) Date of Patent: Feb. 17, 2026

(54) SYSTEM AND METHOD FOR ANALYTE DETECTION

(71) Applicant: Nanohmics, Inc., Austin, TX (US)

(72) Inventors: Mark E. Lucente, Austin, TX (US); John Bruno, Kyle, TX (US); Andrew Foley, Austin, TX (US)

(73) Assignee: Nanohmics, Inc., Austin, TX (US)

( * ) Notice: Subject to any disclaimer, the term of this patent is extended or adjusted under 35 U.S.C. 154(b) by 111 days.

(21) Appl. No.: 18/591,411

(22) Filed: Feb. 29, 2024

(65) Prior Publication Data

US 2024/0295497 A1 Sep. 5, 2024

Related U.S. Application Data

(60) Provisional application No. 63/487,615, filed on Mar. 1, 2023.

(51) Int. Cl.
*G01N 21/23* (2006.01)
*G01N 21/01* (2006.01)
*G01N 21/21* (2006.01)

(52) U.S. Cl.
CPC ............ *G01N 21/23* (2013.01); *G01N 21/21* (2013.01); *G01N 2021/0181* (2013.01); *G01N 2021/216* (2013.01)

(58) Field of Classification Search
None
See application file for complete search history.

(56) References Cited

U.S. PATENT DOCUMENTS

| | | | |
|---|---|---|---|
| 8,835,185 B2 | 9/2014 | Nishiuma et al. | |
| 9,562,900 B2 | 2/2017 | Bruno | |
| 9,739,918 B2 | 8/2017 | Arbabi et al. | |
| 10,228,366 B2 | 3/2019 | Homyk et al. | |
| 10,436,711 B2 * | 10/2019 | Altug | G01N 21/59 |

(Continued)

FOREIGN PATENT DOCUMENTS

| | | | |
|---|---|---|---|
| EP | 3153844 B1 | 5/2018 | |
| WO | WO-2009022246 A1 * | 2/2009 | G01N 21/554 |

(Continued)

OTHER PUBLICATIONS

Altug, H et al., "Advances and applications of nanophotonic biosensors", Nature Nanotech vol. 17: pp. 5-16, (Jan. 17, 2022).

(Continued)

*Primary Examiner* — Rufus L Phillips
(74) *Attorney, Agent, or Firm* — Pierson IP, PLLC

(57) ABSTRACT

A method and system for determining the presence of a selected analyte in a sample include an all-dielectric, metasurface sensor having one or more arrays of subwavelength-scale, dielectric nanopillars having anisotropic cross-sections. Nanopillars in selected regions of the metasurface sensor may be functionalized with binders for selectively binding the selected analyte. Methods for detecting the selected analyte in a sample rely on exposing the sensor to a test sample, probing the sensor with probe light having a selected polarization state, and comparing the polarization state of output light reflected or transmitted by functionalized regions of the sensor with a baseline polarization state of output light determined with a sample lacking the selected analyte.

11 Claims, 6 Drawing Sheets

(56) References Cited

U.S. PATENT DOCUMENTS

| | | | |
|---|---|---|---|
| 10,502,734 | B2 | 12/2019 | Tamayo de Miguel et al. |
| 10,670,782 | B2 | 6/2020 | Arbabi et al. |
| 11,431,889 | B2 | 8/2022 | Noble |
| 11,527,566 | B2 | 12/2022 | Löertscher et al. |
| 2010/0133488 | A1 | 6/2010 | Giakos |
| 2014/0085693 | A1 | 3/2014 | Mosallaei et al. |
| 2016/0361002 | A1* | 12/2016 | Palikaras ............ A61B 5/1455 |
| 2017/0205405 | A1 | 7/2017 | Tamayo de Miguel et al. |
| 2018/0003706 | A1 | 1/2018 | Trenholm et al. |
| 2018/0238794 | A1* | 8/2018 | Kangas ................ G02B 3/0056 |
| 2019/0369421 | A1* | 12/2019 | Satko ...................... G02F 1/116 |
| 2021/0176403 | A1 | 6/2021 | Noble |
| 2021/0373009 | A1 | 12/2021 | Neogi et al. |
| 2022/0028911 | A1 | 1/2022 | Löertscher et al. |
| 2022/0236453 | A1 | 7/2022 | Alùet al. |
| 2023/0279506 | A1* | 9/2023 | Tadimety ......... G01N 33/54333 |
| | | | 435/6.11 |
| 2023/0341384 | A1* | 10/2023 | Dionne ................ G01N 21/648 |

FOREIGN PATENT DOCUMENTS

| | | |
|---|---|---|
| WO | 2022018564 A1 | 1/2022 |
| WO | 2022076832 A1 | 4/2022 |

OTHER PUBLICATIONS

Arbabi, A et al., "Dielectric metasurfaces for complete control of phase and polarization with subwavelength spatial resolution and high transmission", Nature Nanotech vol. 10: pp. 937-943 (Sep. 4, 2015).

Beaucage, SL "Strategies in the Preparation of DNA Oligonucleotide Arrays for Diagnostic Applications", Current Med Chem vol. 8(10): pp. 1213-1244, (2001).

Bontempi N et al., "Highly sensitive biosensors based on all-dielectric nanoresonators", Nanoscale vol. 9: pp. 4972-4980, (Mar. 30, 2017).

Bosch, M, "Polarization states synthesizer based on a thermo-optic dielectric metasurface", J Appl Phys vol. 126: p. 073102, (Aug. 21, 2019).

Bruno, JG et al., "Development of a Fluorescent Enzyme-Linked DNA Aptamer-Magnetic Bead Sandwich Assay and Portable Fluorometer for Sensitive and Rapid Listeria Detection", J Fluoresc vol. 25: pp. 173-183, (Dec. 17, 2014).

Bruno, JG, "Fluorescent DNA Aptamer-Magnetic Bead Sandwich Assays and Portable Fluorometer for Sensitive and Rapid Foodborne Pathogen Detection and Epidemiology", J Infect Dis Epidemiol vol. 2(2): pp. 011 (Mar. 28, 2016).

Cetin, AE et al., "Handheld high-throughput plasmonic biosensor using computational on-chip imaging", Light: Sci & Apps vol. 3: pp. e122, (Jan. 3, 2014).

Chen, WT et al., "A broadband achromatic metalens for focusing and imaging in the visible", Nature Nanotech vol. 13: pp. 220-226, (Jan. 1, 2018).

Cho, I-H et al., "Current Technical Approaches for the Early Detection of Foodborne Pathogens: Challenges and Opportunities", Int J Mol Sci vol. 18: pp. 2078:1-23 (Sep. 30, 2017).

Chung, T, "Plasmonic Nanostructures for Nano-Scale Bio-Sensing", Sensors vol. 11: pp. 10907-10929, (Nov. 21, 2011).

Dorrah, AH et al., "Metasurface optics for on-demand polarization transformations along the optical path", Nature Photonics vol. 15: pp. 287-296, (Jan. 28, 2021).

Estakhri, NM et al., "Wave-front Transformation with Gradient Metasurfaces", Phys Rvw X vol. 6: pp. 041008-1-041008-17, (Oct. 14, 2016).

Fan, Z et al., "Ultrathin wave plates based on bi-resonant silicon Huygens' metasurfaces", Cornell University arXiv:1712.10064, (Dec. 2017).

Fung, F et al., "Food safety in the 21st century", Biomed J vol. 41: pp. 88-95, (May 21, 2018).

Homola, J, "Surface Plasmon Resonance Sensors for Detection of Chemical and Biological Species", Chem Rev vol. 108: pp. 462-493, (Jan. 30, 2008).

Iwanaga, M, "All-Dielectric Metasurface Fluorescence Biosensors for High-Sensitivity Antibody/ Antigen Detection", ACS Nano vol. 14: pp. 17458-17467, (Nov. 24, 2020).

Kelp, G et al., "Application of Metasurface-Enhanced Infra-Red Spectroscopy to Distinguishing Between Normal and Cancerous Cell Types", Analyst vol. 144(4): pp. 1115-1127, (Feb. 21, 2019).

Khorasaninejad, M et al., "Metalenses at visible wavelengths: Diffraction-limited focusing and subwavelength resolution imaging", Science vol. 352(6290): pp. 1190-1194, (Jun. 3, 2016).

Kühne, J et al., "Fabrication robustness in BIC metasurfaces", Nanophotonics vol. 10(17): pp. 4305-4312, (Sep. 6, 2021).

Lalanne, P et al., "Metalenses at visible wavelengths: past, present, perspectives", Laser & Photonics Rvws vol. 11(3): pp. 1600295, (May 8, 2017).

Li, B et al., "Metalens-Based Miniaturized Optical Systems", Micromachines vol. 10: pp. 310-1-310-21, (May 8, 2019).

Luan, E et al., "Label-free biosensing with a multi-box sub-wavelength phase-shifted Bragg grating waveguide", Biomedical Optics Express vol. 10(9): pp. 4825-4838, (Aug. 26, 2019).

Mueller, JPB et al., "Metasurface Polarization Optics: Independent Phase Control of Arbitrary Orthogonal States of Polarization", Phys Rvw Lett vol. 118(11): pp. 113901-1-113901-5, (Mar. 14, 2017).

Overvig, AC et al., "Dielectric metasurfaces for complete and independent control of the optical amplitude and phase", Light: Science & Apps vol. 8: pp. 92, (Oct. 9, 2019).

Pfeiffer, C et al., "Cascaded metasurfaces for complete phase and polarization control", Appl Phys Lett vol. 102: pp. 23116-1-23116-4, (Jun. 11, 2013).

Qin, Y et al., "Ultracompact biosensor based on a metalens with a longitudinally structured vector beam", Appl Optics vol. 58(16): pp. 4438-4442, (May 30, 2019).

Tseng, ML et al., "Dielectric Metasurfaces Enabling Advanced Optical Biosensors", vol. 8(1): pp. 47-60, (Sep. 14, 2020).

Velusamy, V et al., "An overview of foodborne pathogen detection: In the perspective of biosensors", Biotech Adv vol. 28: pp. 232-254, (Dec. 16, 2009).

Wu, C et al., "Fano-resonant asymmetric metamaterials for ultrasensitive spectroscopy and identification of molecular monolayers", Nature Materials vol. 11: pp. 69-75, (Nov. 13, 2011).

Wu, Z et al., "Dual-band moiré metasurface patches for multifunctional biomedical applications", Nanoscale vol. 8: pp. 18461-18468, (Oct. 7, 2016).

Zhu, AY et al., "Ultra-compact visible chiral spectrometer with meta-lenses", APL Photonics vol. 2: pp. 036103-1-036103-12, (Feb. 7, 2017).

Farmani, A et al., "Highly sensitive nano-scale plasmonic biosensor utilizing Fano resonance metasurface in THz range: Numerical study", Physica E: Low-dimensional Systems and Nanostructures vol. 104: pp. 233-240, (Aug. 4, 2018).

Heydari, S et al., "Investigation of novel fractal shape of the nano-aperture as a metasurface for bio sensing application", Physics Letters A vol. 381 (3): pp. 140-144, (Jan. 23, 2017).

Holloway, CL et al., "An Overview of the Theory and Applications of Metasurfaces: The Two-Dimensional Equivalents of Metamaterials", IEEE Antennas and Propagation Magazine vol. 54(2): pp. 10-35, (Apr. 2012).

Liu, G-D et al., "A High-Performance Refractive Index Sensor Based on Fano Resonance in Si Split-Ring Metasurface", Plasmonics vol. 13: pp. 15-19, (Jan. 20, 2017).

Masson, J-F, "Surface Plasmon Resonance Clinical Biosensors for Medical Diagnostics" ACS Sensors vol. 2: pp. 16-30, (Dec. 23, 2016).

Masson, J-F, "Portable and field-deployed surface plasmon resonance and plasmonic sensors", Analyst vol. 145: pp. 3776-3800 (Apr. 27, 2020).

Verre, R et al., "Polarization conversion-based molecular sensing using anisotropic plasmonic metasurfaces", Nanoscale vol. 8: pp. 10576-10581 (Apr. 26, 2016).

Yavas, O et al., "On-a-chip Biosensing Based on All-Dielectric Nanoresonators", Nano Lett vol. 17: pp. 4421-4426, (Jun. 15, 2017).

(56) References Cited

OTHER PUBLICATIONS

Xie, C et al., "Vertical nanopillars for highly localized fluorescence imaging" PNAS vol. 108(10): pp. 3894-3899, (Feb. 22, 2011).
Yavas, O et al., "On-a-chip Biosensing Based on All-Dielectric Nanoresonators", Nano Lett vol. 17: Supp Info pp. 1-10, (Jun. 15, 2017).
Yavas, O et al., "Unravelling the Role of Electric and Magnetic Dipoles in Biosensing with Si Nanoresonators", ACS Nano vol. 13: pp. 4582-4588, (Mar. 28, 2019).
Yavas, O et al., "Unravelling the Role of Electric and Magnetic Dipoles in Biosensing with Si Nanoresonators", ACS Nano vol. 13: Supp Info pp. 1-4, (Mar. 28, 2019).
Arbabi, A et al., "Dielectric metasurfaces for complete control of phase and polarization with subwavelength spatial resolution and high transmission", Nature Nanotech vol. 10: Supp Info pp. 1-9 (Sep. 4, 2015).
Bontempi N et al., "Highly sensitive biosensors based on all-dielectric nanoresonators", Nanoscale vol. 9: Supp Info pp. S1-S5, (Mar. 30, 2017).
Khorasaninejad, M et al., "Metalenses at visible wavelengths: Diffraction-limited focusing and subwavelength resolution imaging", Science vol. 352(6290): Supp Info pp. 1-20, (Jun. 3, 2016).
Kühne, J et al., "Fabrication robustness in BIC metasurfaces", Nanophotonics vol. 10(17): Supp Info pp. 1-3, (Sep. 6, 2021).

\* cited by examiner

SYSTEM AND METHOD FOR ANALYTE DETECTION

CROSS REFERENCE TO RELATED APPLICATIONS

This application claims the benefit of U.S. Provisional Patent Application No. 63/487,615 filed Mar. 1, 2023, which is incorporated by reference herein in its entirety.

STATEMENT OF FEDERALLY SPONSORED RESEARCH

The invention was made, in part, with government support under grant number 1R43FD006910-01 awarded by the U.S. Food and Drug Administration. The government has certain rights in the invention.

TECHNICAL FIELD

The disclosure relates to a system and method for detecting analytes using an optical sensor comprising an all-dielectric metasurface functionalized with analyte binders.

GENERAL DESCRIPTION

Optical metasurfaces having subwavelength nanostructures are emerging as useful for manipulating light in a variety of applications including spectral filtering, phase and polarization control of light, beam generation and splitting, and light focusing, to name a few. Some properties of optical metasurfaces have recently been evaluated for detecting molecules. For example, surface plasmon resonance sensing employs metallic nanostructures and relies on the sensitivity of metal plasmons to refractive index change caused by binding of an analyte to a ligand immobilized on a nanostructure having a thin metal film. Analyte detection sensitivity with surface plasmon resonance (SPR) sensing can suffer due to excessive heating and limitations in the degree of spectrum shifting and the measurement of absorption spectra. Most SPR-based sensors require precise prism alignment for coupling of probe light to a test sample, which results in hardware dimensions that make them unsuitable for portability. To overcome some of the limitations of surface plasmon resonance sensors, dielectric nanosensors have been evaluated. Depending on the detection method for a specific nanosensor, these can suffer from the need to perform fluorescence detection or from the need to measure difficult spectral response measurements with spectrum analyzers for detecting absorption resonance shifts or emission shifts, which can result in low sensitivity of detection.

SUMMARY

Embodiments described herein provide a method and system for determining the presence of an analyte in a test sample. In some aspects, the method and system may be useful for quantifying an analyte in a sample. Embodiments described herein overcome the problems with other systems and methods by employing an all-dielectric, metasurface sensor functionalized for selective analyte binding and by analyzing light reflected by or transmitted through the metasurface sensor for a change in polarization state as an indicator of selective analyte binding. Systems disclosed herein are easier to manufacture and are simpler to operate than previous systems and methods for optical analyte detection. The embodiments described herein overcome the need for high-precision alignment, enabling ready portability, lowering costs, and allowing for high-density multiplex detection capabilities in a small package. Systems and methods described herein also enable continuous probing of a sample for the presence of an analyte thereby increasing sensitivity and accuracy of detection with low signal-to-noise ratio when compared with other detection technologies.

In many embodiments, the system comprises an all-dielectric, metasurface sensor, the metasurface sensor comprising one or more arrays of subwavelength-scale, dielectric, anisotropic, metasurface nanostructures, referred to as "nanopillars", positioned on a dielectric, metasurface substrate. Selected regions of the metasurface sensor, referred to as "dots", include nanopillars and substrate surface in a selected region and may be functionalized with binders designed for selective capture and binding of a selected species of analyte that may be present in a sample undergoing analysis.

In some aspects, the polarization state of output light that has passed through a properly configured polarization sensor can be indicative of the presence or absence of a selected analyte in a sample. In some aspects, the polarization state of output light, determined after exposure of a test sample to a functionalized dot on the all-dielectric, metasurface sensor, may be compared to the polarization state of output light determined after exposure of a control sample, lacking the selected analyte, to the functionalized dot on the all-dielectric, metasurface sensor, and based on the comparison, the presence or absence of the selected analyte in the test sample may be determined. In some aspects, the amount of a selected analyte in a sample may be determined.

In some aspects, the selected species of analyte and the binder used for its selective capture may be biological molecules. In some aspects, the sample undergoing analysis may be a biological sample or may be prepared from a biological sample. The presence of a selected species of analyte in a sample may be indicative of a disease or condition.

In some aspects, different dots on a metasurface sensor may be functionalized differently for detecting different species of analytes. By way of example, one or more selected dots may be functionalized with binders that selectively bind, for example, analyte species "A", and one or more selected different dots may be functionalized with binders that selectively bind, for example, analyte species "B". In some aspects then, a dot on a metasurface sensor may be functionalized with analyte binders so as to be selective for a single species of analyte. In other examples, a single dot may be functionalized with two or more different species of selective binders so that two or more different species of analytes, if present in a sample, may selectively bind with their respective analyte binder species in the single functionalized dot.

In some embodiments, one or more values for selected parameters of one or more components of a metasurface system may be EM simulated to identify a sensor model useful for various methods described herein.

BRIEF DESCRIPTION OF THE DRAWINGS

The following drawings form part of the specification and are included to further demonstrate certain embodiments described herein. Embodiments may be better understood by reference to one or more of these drawings in combination with the detailed description of the embodiments presented herein. Drawings are not necessarily drawn to scale or intended to be. For purposes of clarity, every component or structure that may be part of an embodiment may not be depicted in every drawing. The use of a letter following an element number is for descriptive purposes only. For example, 102a and 102b each refer to nanopillar 102, but may refer to different nanopillars 102 or different embodiments of nanopillar 102 in a figure as an aid in understanding the description of the drawing. In some drawings and views, for purposes of clarity and for understanding embodiments of the invention, the relative sizes of structural elements are not necessarily reflective of actual relative sizes in embodiments of the invention.

DETAILED DESCRIPTION

Reference will now be made in detail to certain exemplary embodiments, some of which are illustrated in the accompanying drawings. Certain terms used in the application are first defined. Additional definitions may be provided throughout the application.

The symbol "~", which means "approximately", and the terms "about" or "approximately" are defined as being close to, as would be understood by one of ordinary skill in the art. In an exemplary non-limiting embodiment, the terms may be used to mean within 10%, within 5%, within 1%, or within 0.5% of a stated value. For example, "about 4" or "~4" may mean from 3.6-4.4 inclusive of the endpoints 3.6 and 4.4, and "about 1 nm" may mean from 0.9 nm to 1.1 nm inclusive of the endpoints 0.9 nm and 1.1 nm. All ranges described herein are inclusive of the lower and upper limit values. The terms "approximately" and "about" may account for industry-accepted tolerance for the corresponding term and/or relativity between items.

As used herein, the term "equal" and its relationship to the values or characteristics that are "substantially equal" would be understood by one of skill in the art. Typically, "substantially equal" can mean that the values or characteristics referred to may not be mathematically equal but would function as described in the specification and/or claims. As used herein, "substantially" may mean "largely but not wholly". The term "substantially" may account for industry-accepted tolerance for the corresponding term and/or relativity between items.

As used herein, the phrases "at least one", "one or more", and "one or more than one" are meant to include one and more than one of an element or step referred to and may be used interchangeably herein.

As used herein, the phrases "at least one of A or B", "one or more of A or B", "at least one of A and B", and "one or more of A and B" are each meant to include one or more of only A, one or more of only B, or any combination and number of A and B. Any combinations having a plurality of one or more of any of the elements or steps listed are also meant to be included by the use of these phrases. For example, the combinations of 1A and 1B, 2A and 1B, 2B and 1A, and 2B and 2A are included. Similar phrases for longer lists of elements or steps, by way of example only, "at least one of A or B or C", and "at least one of A and B and C", are also contemplated to indicate one or more of either element or step alone or any combination including one or more of any of the elements or steps listed. As used herein, "one or more of" means "one or more than one of".

Figure 1A:
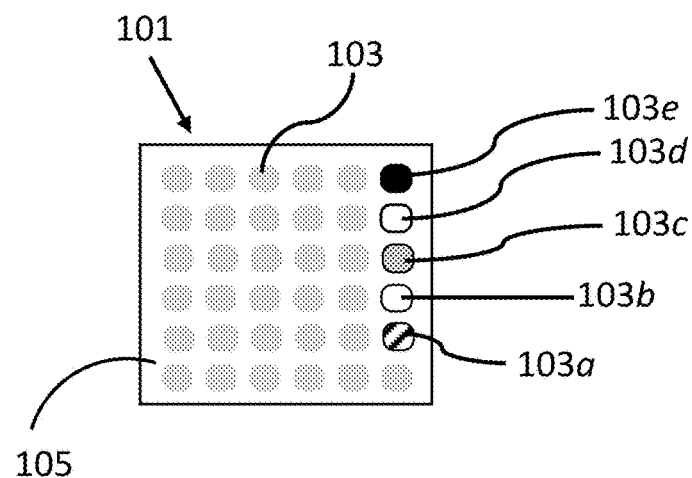
FIGS. 1A-C depict a schematic overview of selected elements of one embodiment of an all-dielectric, metasurface sensor and system for determining the presence or absence of an analyte in a sample.
Figure 1B:
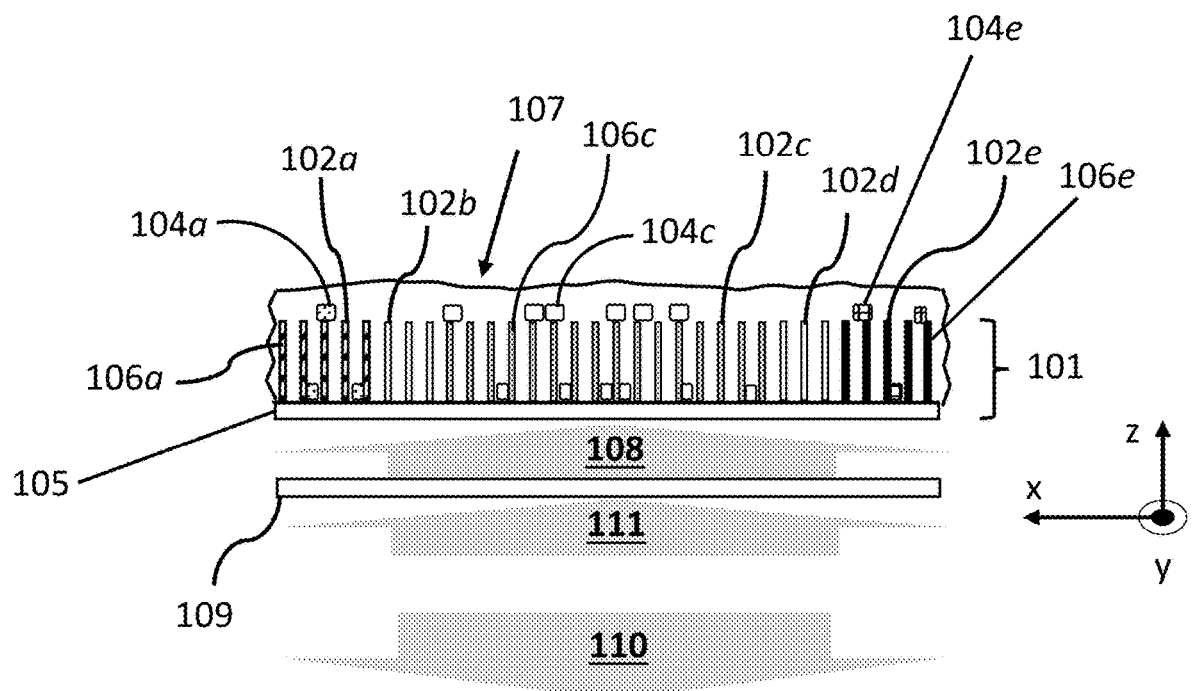
Figure 1C:
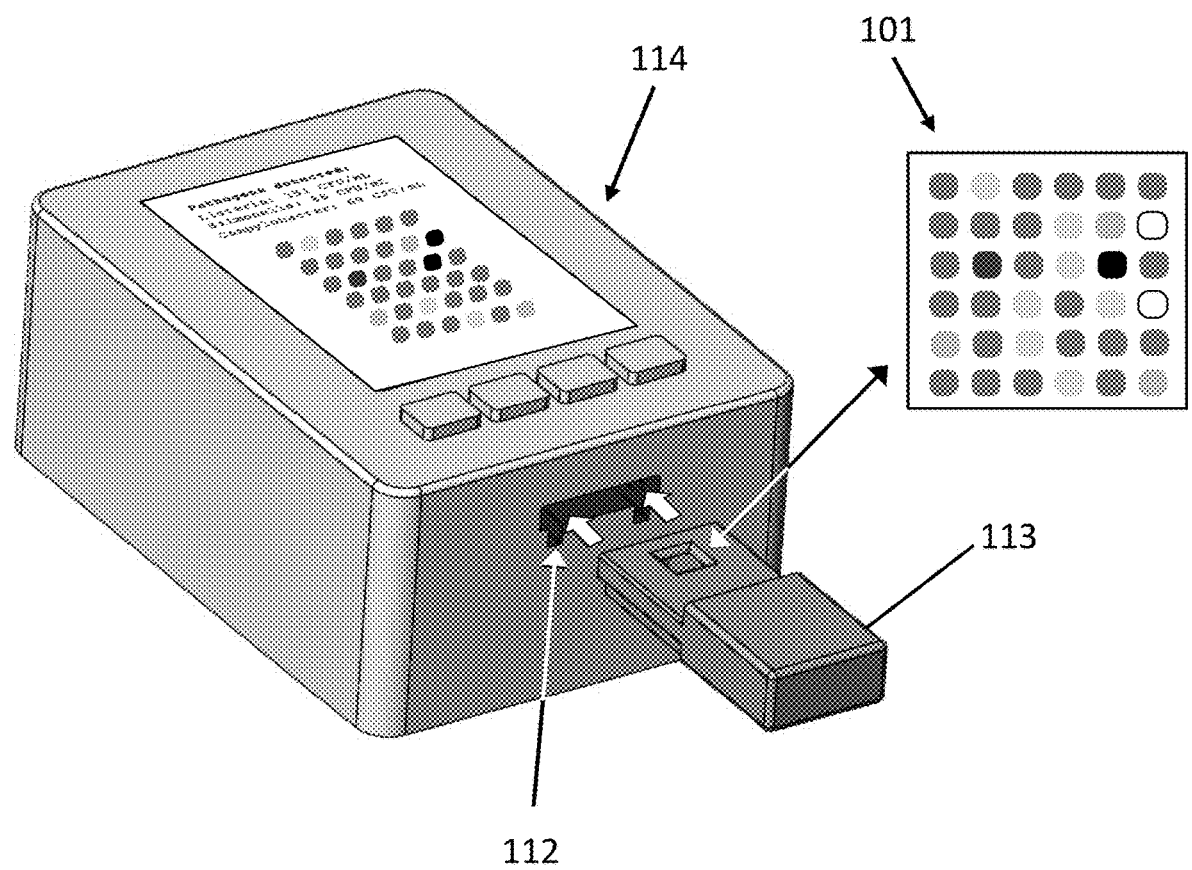

FIGS. 1A-C depict a schematic overview of selected elements of one embodiment of a metasurface system 100 for determining the presence or absence of analyte 104 (104a, 104c, 104e) in sample 107. In this exemplary embodiment, all-dielectric, metasurface sensor 101 (FIGS. 1A-B) comprises dielectric, subwavelength scale, nanopillars 102 (102a, 102b, 102c, 102d, 102e) positioned on an optically transparent, dielectric, metasurface substrate 105, as in the schematic side view of metasurface sensor 101 shown in FIG. 1B. For brevity, the term "sensor" as used herein refers to the all-dielectric, metasurface sensor 101, the terms "nanopillar" and "nanopillars" as used herein refer to the dielectric, metasurface nanopillars 102, and the term "substrate" refers to the dielectric, metasurface substrate 105.

Discrete regions of sensor 101, comprising nanopillars 102 and regions of substrate 105 between and among nanopillars 102, are referred to herein as "dots" 103 (e.g., 103a, 103b, 103c, 103d, 103e, FIG. 1A). In some aspects, one or more selected dots 103 may be functionalized with binders 106 that are configured to selectively bind with an analyte 104. In some aspects, one or more selected dots 103 are not functionalized with binders 106. Non-functionalized, dielectric components include nanopillars 102 and surrounding regions of substrate 105 that are not functionalized with binders 106. In this example, functionalized dot 103a comprises nanopillars 102a and regions of substrate 105 that are between and among nanopillars 102a, both being functionalized with binders 106a that are configured to selectively bind with analyte 104a. Functionalized dot 103c comprises nanopillars 102c and regions of substrate 105 that are between and among the nanopillars 102c, both being functionalized with binders 106c that are configured to selectively bind with analyte 104c. Functionalized dot 103e comprises nanopillars 102e and regions of substrate 105 that are between and among nanopillars 102e, both being functionalized with binders 106e that are configured to selectively bind with analyte 104e. Dots 103b and 103d are not functionalized with binders 106. In this schematic, the different shadings of nanopillars 102 are meant to represent binders 106. However, it is to be noted that binders 106 in a functionalized dot 103 will also be present on substrate 105 regions that are between and among nanopillars 102 in the functionalized dot 103. In the top down schematic FIG. 1A, dots 103a, 103c, and 103e, are functionalized with binders 106a, 106c, and 106e, respectively. Non-functionalized dot 103b is positioned between dots 103a and 103c, and non-functionalized dot 103d is positioned between dots 103c and 103e. (FIGS. 1A-B). The absence of shading for nanopillars 102b, 102d in FIG. 1B is meant to indicate that these nanopillars 102 and surrounding substrate 105 surface, are not functionalized with binders 106. In this exemplary embodiment, sensor 101, schematically shown in (FIG. 1A), is configured to have space for at least 36 discrete dots 103, allowing for multiplex detection and quantification of up to 36 different analytes 104 in sample 107.

For use in determining the presence or absence of an analyte 104 in sample 107, sensor 101 is exposed to sample 107, typically a liquid sample, under conditions that are suitable for selective binding of analytes 104 (e.g., 104a, 104c, 104e) with their respective selective binders 106 (106a, 106c, 106e) positioned at respective dots 103 (103a, 103c, 103e). In some aspects, sample 107 exposure to sensor 101 and optical probing may occur simultaneously in optical reader 111 (FIG. 1C).

In some embodiments, optical reader 114 may comprise a port 112 for insertion of sensor 101 (FIG. 1C). In many aspects, selected optical components of reader 114 are mounted beneath sensor 101 (e.g., FIG. 4). In some aspects, sensor 101 may be positioned in cassette 113 to facilitate handling and insertion of sensor 101 into port 112. Cassette 113 may be useful for secure positioning and retention of sensor 101 during sample analysis. In some aspects, cassette 113 may be manufactured by suitable methods known in the art for plastics manufacturing, for example by injection molding of plastic.

In some embodiments, metasurface system 100 may be configured to operate in reflection mode (FIG. 1, FIG. 4). In some aspects, system 100 may be configured to operate in transmission mode (FIG. 5). In reflection mode operation, optical probing of sensor 101 during exposure of the sensor to sample 107 comprises exposing sensor 101 to light incident on sensor 101, referred to herein as "probe light" 108, from beneath substrate 105 (FIG. 1B). That is, in reflection mode operation, probe light 108 is incident on substrate 105 from the side on which binders are not affixed to substrate 105, as is shown in FIG. 1B and FIG. 4. In some aspects, input waveplate 109 is positioned immediately beneath substrate 105 of sensor 101 is configured to convert linearly polarized light 111 to probe light 108 that is circularly polarized, the circularly polarized probe light 108 having an input polarization state designated $p_i$ ($p_{input}$). In some aspects, the use of circularly polarized probe light 108 may assist at minimizing unwanted reflection from non-functionalized dielectric components of sensor 101. For ease of viewing, in FIG. 1B input waveplate 109 is shown as being positioned at a distance from substrate 105, but in many aspects may be positioned immediately adjacent to and beneath substrate 105. That is, in some aspects, input waveplate 109 may be positioned to be in contact with substrate 105, and in some aspects may be positioned adjacent to but not contacting substrate 105.

In some embodiments, metasurface sensor 101 is operated in reflection mode as shown schematically in FIG. 1B, and circularly polarized probe light 108 travels from input waveplate 109 through substrate 105 and upward into dots 103 and among nanopillars 102 and may be at least partially reflected downward by one or more dots 103 and through input waveplate 109 as reflected output light 110, having an output polarization state designated $p_o$ ($p_{output}$). Output light 110, reflected by a selected dot 103, may be detected and measured by polarization sensor 407 (FIGS. 4A-4B, 5A-5B), and the output polarization state, $p_o$, of reflected output light 110 may be measured and analyzed according to methods described herein.

In some embodiments, sensor 101 may be exposed to sample 107 that is known to lack a selected analyte 104, such as for example a "negative control sample" known to not have the selected analyte 104. When exposed to sample 107 lacking selected analyte 104, output light 110, reflected by dot 103 during optical probing with input light 108, has an output polarization state designated $p_{oN}$ ($p_{outputN}$). The output polarization state $p_{oN}$ of this reflected output light 110 may be measured and analyzed according to methods described herein.

In some aspects, sensor 101 may be exposed to sample 107 that is a sample being analyzed for the presence of selected analyte 104, which may also be referred to herein as a "test sample" or sensor 101 may be exposed to sample 107 that is a sample known to have the selected analyte 104, which may also be referred to herein as a "positive control sample". Output light 110 reflected by dot 103 during exposure to a test sample or to a positive control sample has an output polarization state designated $p^{oA}$ ($p_{outputA}$). The output polarization state $p_{oA}$ of this reflected output light 110 may be measured and analyzed according to methods described herein.

In some embodiments, determining the presence of a selected analyte 104 in a sample 107 (e.g., in a test sample or a positive control sample) may comprise measuring $p_{oA}$ ($p_{outputA}$) and $p_{oN}$ ($p_{outputN}$) and comparing $p_{oA}$ to $p_{oV}$ according to methods described herein. In some aspects, a difference between $p_{oA}$ and $p_{oN}$ may be indicative of the presence of analyte 104 in the test (or positive control) sample 107.

In many embodiments, nanopillars 102 useful for sensor 101 are configured to have an anisotropic cross-section, such as for example an elliptical or rectangular cross-section having two widths, $D_x$ and $D_y$. In some embodiments, e.g., in the absence of analyte 104 binding to selective binders 106 in a functionalized dot 103, an array of anisotropic nanopillars 102 on substrate 105 is configured to act as a uniform polarization waveplate. In general, an array of anisotropic nanopillars 102 configured in this manner enables birefringence.

In some aspects, sensor 101, having an array of anisotropic nanopillars 102, is exposed to probe light 108, having a polarization state $p_i$, which may be reflected by or transmitted through one or more selected dots 103 as output light 110. Probe light 108 polarized along each axis (x, y) is reflected by or transmitted through sensor 101, with generally different phases as a function of the two unequal nanopillar 102 widths, $D_x$ and $D_y$. In some aspects, reflected or transmitted output light 110 (polarization state $p_o$) may comprise polarization components of light exhibiting different phase shifts and light intensities than those observed for probe light 108. That is, the polarization state $p_o$ of output light 110 may be different than the polarization state $p_i$ of output light 108. As a result of birefringence, anisotropic nanopillars 102 in a dot 103 may cause a change in the phase relationship or relative phase of two orthogonal polarization components, herein $E_x$ and $E_y$, of probe light 108, oriented in the x or y directions respectively at the sensor surface. This change in the relative phase of $E_x$ and $E_y$ may also be referred to as the phase difference, $\Delta\phi$ (or $\phi_y - \phi_x$) As such, the change in $\Delta\phi$ would be represented in and detectable in the two orthogonal polarization components, $E_x$ and $E_y$, of output light 110. In some aspects then, $\Delta\phi$ as used herein represents a change from the polarization state of input light 108 to a different polarization state of output light 110. In many aspects herein, probe light 108 may be circularly polarized prior to optically probing sensor 101 so as to provide equal optical power (intensity) in each of the two orthogonal polarization components, $E_x$ and $E_y$ of the input probe light 108.

In many embodiments, an observed $\Delta\phi$ and the intensity of light in each of $E_x$ and $E_y$ in output light 110 may be measured and analyzed according to methods described herein. In some aspects, the polarization components $E_x$ and $E_y$ and their light intensities in output light 110 measured by polarization sensor 407 are representative measurements of the polarization state of output light 110 received by polarization sensor 407 and are useful for comparing the polarization state of output light 110 to the polarization state of input light 108.

In some aspects, the polarization state of output light 110 reflected by a dot 103 under a first set of conditions may be measured and compared with the polarization state of output light 110 reflected by a dot 103 under a second set of conditions. By way of example, in some aspects, the polarization state of output light 110, reflected by a functionalized dot 103 during exposure to a positive control sample 107 (i.e., a sample known to have a selected analyte 104 of interest) or during exposure to a test sample 107 that is being analyzed for the presence of the selected analyte 104 of interest, may be measured and compared to the polarization state of output light 110 reflected by the functionalized dot 103 during exposure to a sample lacking the selected analyte 104 of interest. The $\Delta\phi$ and light intensities of output light 110 measured during exposure of a functionalized dot 103 on sensor 101 to a sample 107 lacking a selected analyte 104 of interest (e.g., a negative control sample) are referred to herein as "baseline" measurements and represent measurement of a "baseline" polarization state designated Pox of output light 110.

In some aspects, in the presence of a selected species of analyte 104 bound to selective binders 106 in a functionalized dot 103, probe light 108 incident on sensor 101 may be reflected or transmitted by the functionalized dot 103 as output light 110, and a change in the $\Delta\phi$ of probe light 108 may be observed in the output light 110. In this situation, the $\Delta\phi$ and light intensities of output light 110 represent measurements of the polarization state designated $p_{oA}$. In many aspects, the $\Delta\phi$ and the $E_x$ and $E_y$ light intensities in output light 110 measured when probing a functionalized dot 103 having a selected analyte 104 of interest bound to selective binders 106, i.e., the $p_{oA}$, is different from the $\Delta\phi$ and the $E_x$ and $E_y$ light intensities in output light 110, measured when probing a functionalized dot 103 having no analyte 104 bound to selective binders 106, i.e., the $p_{oN}$. That is, the polarization state $p_{oA}$ of output light 110 is different from the "baseline" polarization state pox of output light 110. Therefore, comparing the baseline polarization state pox of output light 110, measured when probing a sensor 101 in the presence of a sample 107 that lacks a selected species of analyte 104, to the polarization state $p_{oA}$ of output light 110, measured when probing the sensor 101 in the presence of a test sample 107 that may contain the selected species of analyte 104, can be useful for determining the presence of the selected species of analyte 104 in the test sample 107. In some aspects, observing a difference between the polarization states $p_{oA}$ and $p_{oN}$ is indicative of the presence of the selected analyte 104 in the test sample 107. In some aspects, such a comparison may be used for quantifying the selected analyte 104 species in the test sample 107.

Figure 4A:
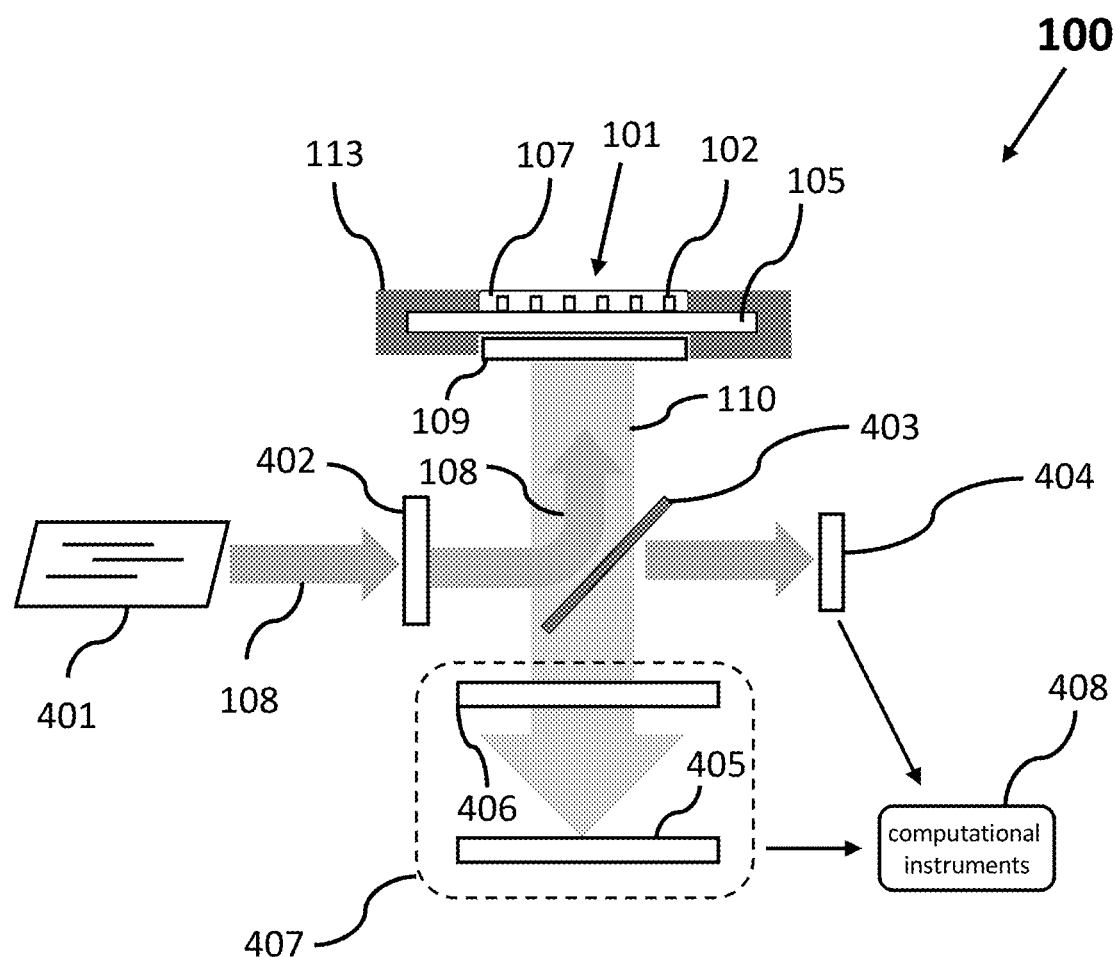
FIGS. 4A-B are schematic side views of an exemplary embodiment of a metasurface system.
Figure 5A:
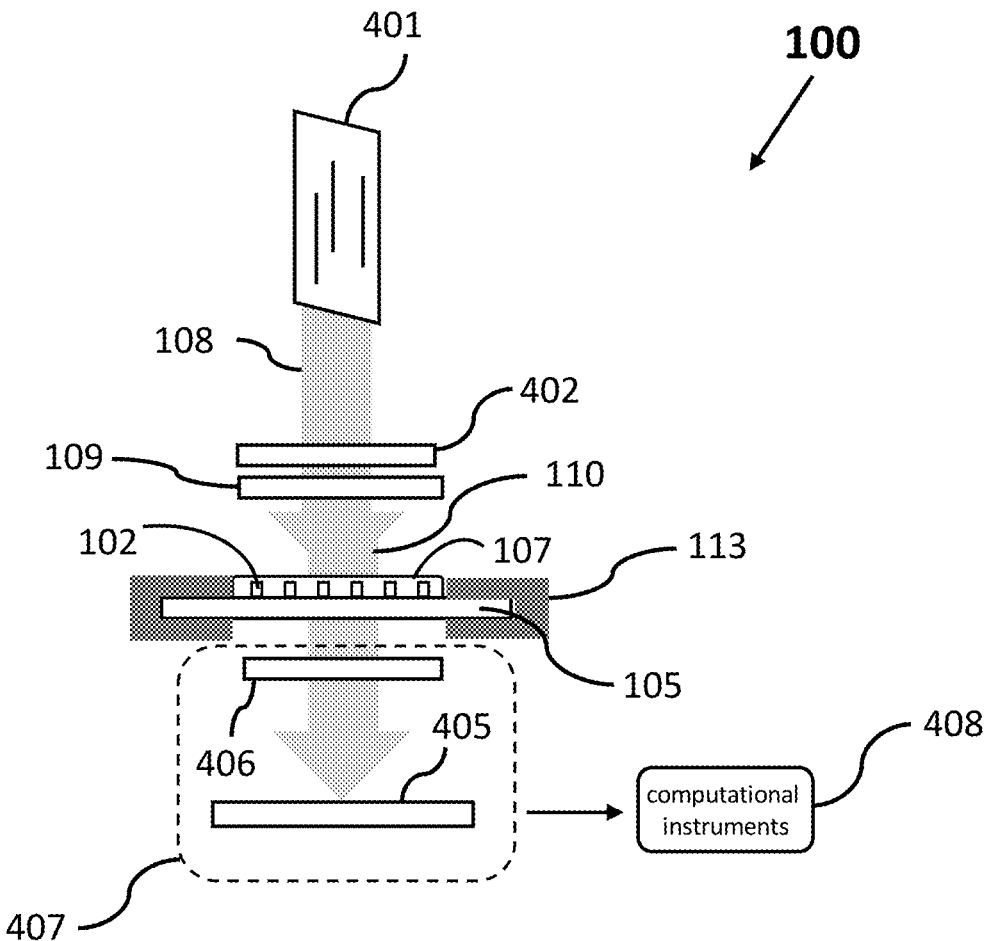
FIGS. 5A-B are schematic side views of an exemplary embodiment of a metasurface system.
Figure 5B:
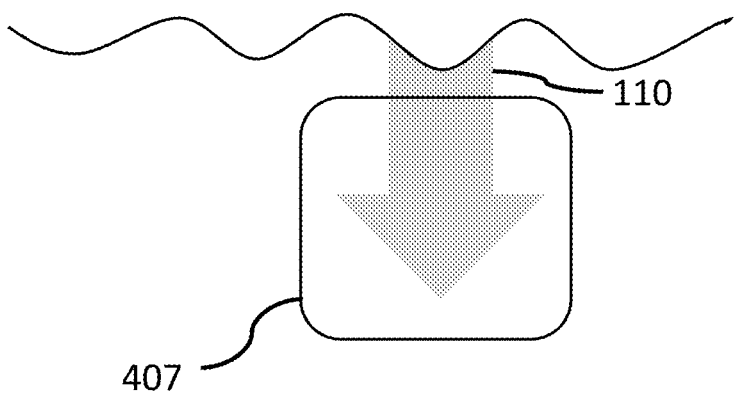

In some embodiments, input probe light 108 may not be circularly polarized, but instead may be linearly polarized or elliptically polarized. In some aspects, when metasurface system 100 is used in reflection mode operation as in FIGS. 1B and 4A, optical probing of sensor 101 comprises exposing sensor 101 to linearly polarized probe light 108 from beneath substrate 105. Typically however, when probe light 108 is linearly polarized, input waveplate 109 shown in FIG. 1B is not required for operation of metasurface system 100 and may be omitted. Similarly, when metasurface system 100 is used in reflection mode operation with linearly polarized probe light 108 first polarizer 402 in FIG. 4A, is not required for operation of metasurface system 100 and may be omitted. In many aspects, linearly or elliptically polarized probe light 108 may be adjusted to have adequate intensity in both the polarization components $E_x$ and $E_y$ of the orthogonal axes, so that upon exposure to incident probe light 108, output light 110 exhibits measurable phase shifts in its two orthogonal polarization components.

In general, many standard lithographic techniques may be useful for fabrication of sensor 101. In some embodiments, optically transparent, all-dielectric metasurface sensor 101 may be fabricated from a wide variety of dielectric materials, typically from materials that are low light absorbing and that provide contrast in refractive index relative to their environment. By way of example, for use in detecting selected analyte 104, dielectric materials that provide contrast in refractive index relative to liquid sample 107 may be useful. In some aspects, for manufacture of sensor 101 configured for operation in the visible (VIS) or near infrared (NIR) wavelengths of the electromagnetic spectrum, suitable dielectric materials may include patterned silicon (Si), titania ($Ti_2O_3$), alumina ($Al_2O_3$), plastic, silicon nitride ($Si_3N_4$), or gallium nitride (GaN) for nanopillars 102 and glass, silicon dioxide ($SiO_2$), zinc selenide (ZnSe), or quartz for substrate 105. In some aspects, other useful materials stacks may include patterned $SiO_2$ on an $SiO_2$ substrate or quartz substrate, patterned quartz on a quartz substrate, or patterned dielectric polymer on a polymer or $SiO_2$ substrate.

Figure 2A:
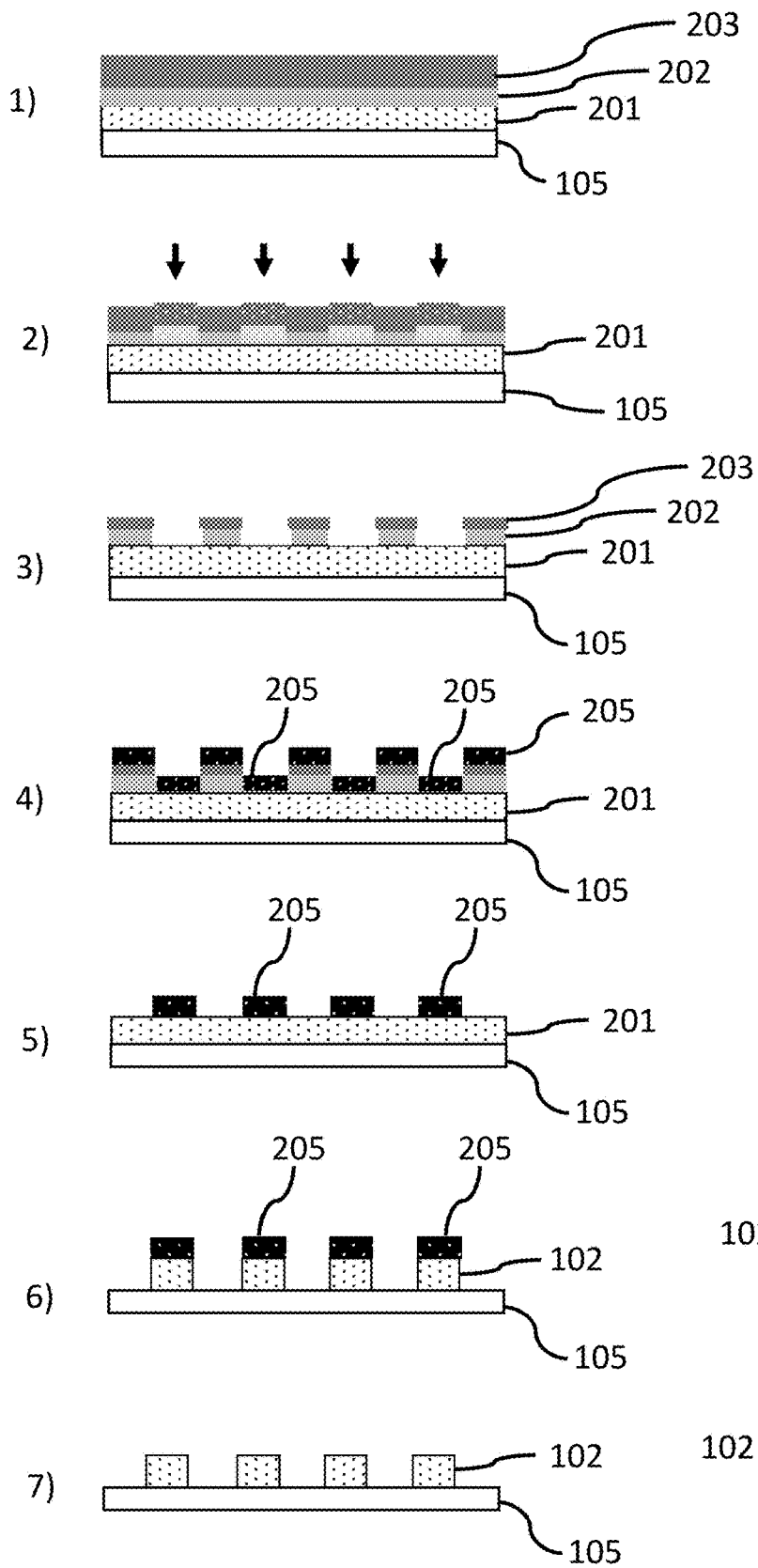
FIGS. 2A-C show exemplary steps and structures of one embodiment for manufacturing an all-dielectric, metasurface sensor.
Figure 2B:
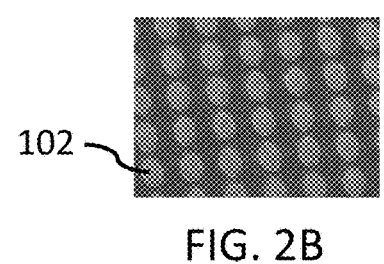
Figure 2C:
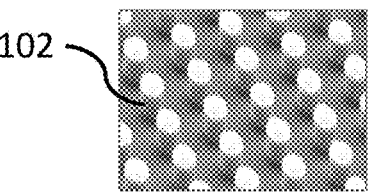

FIGS. 2A-C show exemplary steps and structures from one embodiment for manufacturing metasurface sensor 101. In some embodiments, sensor 101 may be microfabricated using electron beam lithography (EBL). In some aspects, EBL is used to pattern a hard mask, followed by etch transfer of the hard mask pattern to an underlying Si thin film on a fused silica substrate 105. In this exemplary method, metasurface fabrication begins at 1) with deposition of a dielectric thin film 201 on a substrate 105. An example of a materials stack is dielectric silicon (Si) 201 on fused silica wafers as substrate 105, using low pressure chemical vapor deposition (LPCVD). Step 1 shows that two layers of resist 202, 203 are deposited on top of the dielectric layer 201 to be patterned. At 2) the two-layer resist (202, 203) is exposed to EBL. Subsequent developing results in the structure shown at 3) in FIG. 2A, which shows how EBL nanopatterning results in a layer of resist (202, 203) with an array of holes, each with lateral dimensions selected to produce the desired nanopillar 102 geometry configuration. To transfer the pattern, at 4) sputter deposition may be used to deposit an ~50 nm layer of alumina ($Al_2O_3$) 205 through the elliptical holes in the mask. The structure at 5) results after using an RCA clean and liftoff technique to leave only a periodic array of alumina ellipses 205 directly on the dielectric layer 201. As shown at 6), a reactive ion etch (RIE) may be used to remove a specific depth of dielectric silicon layer 201 around the hard mask alumina ellipses 205 to form dielectric nanopillars 102, with elliptical cross sections (as shown in FIG. 2B). At 7), a wet etch may be used to remove the hard mask ellipses 205, leaving an array of all-dielectric nanopillars 201 (as shown in FIG. 2C). After dicing and cleaning, each diced metasurface sensor 101 chip is ready for functionalization with binders 106. In some aspects, the thickness of the fabricated metasurface sensor 101 may be less than about one micron.

Metasurface sensor 101 may be fabricated and configured to operate in many regions of the electromagnetic spectrum, such as for example only, the VIS, NIR, short-wave infrared (SWIR), and/or mid-wave infrared (MWIR) regions, as well as in other spectral regions. In many embodiments, a useful sensor 101 comprises nanopillars 102 having sub-wavelength dimensions, smaller than the optical wavelength of light that is to be manipulated, i.e., smaller than the wavelength of input probe light 108.

In many embodiments, dimensions of nanopillars 102 may be selected to maximize or significantly enhance the impact of analyte 104—binder 106 interactions, on or near nanopillars 102, on the optical resonance within nanopillars 102 in a functionalized dot 103, thereby maximizing or significantly enhancing the change in birefringence, acting on input probe light 108, that is observed upon polarization analysis of reflected or transmitted output light 110.

In many embodiments, one or more dots 103 on metasurface sensor 101 may be functionalized with analyte binders 106 designed for selective capture and binding of a selected analyte 104 that may be present in a sample 107 undergoing analysis. In some aspects, functionalization of dots 103 may begin with a silanization step, which may use any of a variety of well-known chemical reactions to coat substrate 105 and nanopillar 102 surfaces in dot 103 with a monolayer of silane molecules. Surface silane molecules may then be derivatized to enable coupling of selected binders 106 to dot 103. Exemplary derivatizations include the addition of epoxy or glutaraldehyde molecules. For example, in some embodiments silanization employs (3-aminopropyl)triethoxysilane (APTES) followed by derivatization with poly-L-Lysine (PLL) and glutaraldehyde. A metasurface sensor 101 on a chip may be immersed in the silane mixture for five minutes then washed with 95% ethanol and baked at 110° C. for one hour. In some aspects, silane molecules may be capable of non-specifically binding with many different proteins, including proteins that may not be an analyte 104 selected for detection. Therefore, in some aspects, following functionalization of dots 103 with binders 106, metasurface sensor 101 can be exposed to a blocking solution to prevent non-specific binding of proteins and/or other molecules to un-reacted silane groups.

Following silanization of sensor 101, attachment of binders 106 may be achieved in any of a variety of ways. In some embodiments, drop casting may be used for applying binders 106 to dot 103. By way of example only, a dot 103 may be functionalized with binder 106 that is an antibody designed to selectively or specifically bind with a selected antigen analyte 104. A drop of antibody solution, comprising a selected amount of the antibodies in sterile phosphate buffered saline (PBS) can be placed on a region of a silanized metasurface sensor 101 and allowed to dry, thereby forming a functionalized dot 103 on sensor 101. The functionalized dot 103 comprises nanopillars 102 and regions of substrate 105 among the nanopillars having antibody binders 106 attached thereto that are chosen to selectively bind with a selected species of analyte 104.

In some embodiments, sensor 101 may be configured for multiplex detection and/or quantification of a plurality of selected different analyte 104 species. As used herein, the terms "analyte species" or "species of analyte" refers to specific different analytes 104. By way of example only, different proteins may be considered different analyte 104 "species", nucleic acid molecules having different sequences may be considered different analyte 104 "species", and different molecules of many kinds may be considered different analyte 104 "species". In some aspects, the terms "binder species" and "species of binder" refer to a specific binder 106 that binds selectively to a selected species of analyte 104. A sensor 101 configured for multiplex detection may comprise a plurality of dots 103, each dot 103 being functionalized with a different binder 106 species that is configured for selectively binding a selected, different species of analyte 104.

In some aspects, a sensor 101 configured for multiplex detection of different species of analytes 104 can be prepared using microspotting techniques. By way of example only, after silanization a microspotting robot may deposit a plurality of different binder 106 species to sensor 101, each different binder 106 species being chosen to selectively bind to a different analyte 104 species and being applied to a different dot 103 location on sensor 101. Robotic microspotting thus enables multiplex functionalization of sensor 101. In some aspects, microspotting may be performed using a three-axis motion control system, such as the TTA Series Tabletop Robot (IAI Corporation, Shizuoka, Japan) or the AD1520™ Aspirate Dispense System (BioDot, Irvine, Calif.). In some aspects, an array of functionalized dots 103 on sensor 101 may comprise dots having diameters of about 0.3 mm on a pitch of about 0.4 mm, such that a 6×6 array of dots 103 may span less than 3 mm×3 mm.

Numerous methods and reagents useful for attachment of binders 106 (e.g., chemical and biological structures) to surfaces on metasurface sensor 101 are known to a person having ordinary skill in the art (e.g., Beaucage, SL, Curr. Med. Chem. 8:1213-1244, 2001 which is incorporated by reference herein in its entirety) and are commercially available (e.g., from Sigma-Aldrich Co. LLC, St. Louis, MO, USA). Exemplary attachment linkers include silanes, glutaraldehydes, succinimides, carboxylates, epoxies, and phosphonates to name a few.

In embodiments described herein, sensor 101 functionalized with one or more selected species of binders 106 may be used for determining the presence or absence of and/or quantifying one or more selected species of analytes 104 in a sample 107. In some aspects, "sample" 107 refers to a sample that is analyzed to determine the presence of, identity of, and/or quantity of one or more analyte 104 species and may also be referred to as a "test sample". In some aspects, a sample may be a "test sample" or a "control sample" or both. That is, in some aspects a test sample may comprise one or more known selected species of an analyte 104. A control sample may comprise one or more known, selected species of analyte 104 (i.e., a positive control sample for the one or more known selected analyte species) or may lack one or more known, selected species of analyte 104 (i.e., a negative control sample for the one or more known selected analyte species). In many embodiments, a test sample 107 is a liquid or comprises a liquid. In some aspects, sample 107 liquid may comprise known ingredients in known amounts, e.g., buffers, water, and chemicals.

A sample 107 for analysis may be derived from or originate from any of a variety of materials. By way of example only, sample 107 may be derived from biological material (e.g., a biological sample) or from environmental material (e.g., an environmental sample). For example, sample 107 for analysis may be derived from or extracted from blood, tissue, plant matter, animal matter, food, feed, packaging, processing surfaces, food processing tools, farming tools, clothing, soil, water, or other solid, liquid, or gaseous material. In some aspects, sample 107 may be, for example a biological threat sample, which may have been collected by a military or first responder. In some aspects, sample 107 may be a biological sample, such as for example only, a sample taken from a patient. Sample 107 may be from a patient that has tested positive for a disease or condition, a patient undergoing treatment, a patient with a tumor, a patient having a known mutation that results in the production of a disease-specific analyte, or a patient suspected of having a disease or condition. Sample 107 may be analyzed for the presence of one or more analyte 104 species that may be indicative of the presence of a pathogen, a virus, a prion, a fungus, a bacterium, or another organism in the sample. In some aspects, sample 107 may have or be suspected of having an analyte 104 that is a biological toxin or toxicant. In some aspects, sample 107 may be prepared using methods designed to enrich, isolate, or purify a selected analyte 104 of interest in a form that will promote selective binding with binder 106. Methods for extracting, isolating, or purifying biological molecules and chemicals from numerous types of samples, including biological, environmental, and industrial or pharmaceutical manufacturing samples, are readily available to a person having ordinary skill in the art.

In some embodiments, a binder 106 that selectively binds a selected analyte 104 may be said to be complementary to the analyte, and the binder 106 and analyte 104 may interact in a specific manner. A binder 106, e.g., a bioreceptor, that selectively binds to an analyte 104, may be useful for detecting that specific analyte 104 in sample 107. One example of selectivity is the interaction of an antigen with the antibody. Classically, antibodies may act as bioreceptors and are often used when detection of a specific antigen is desired.

In some aspects, binders 106 useful in embodiments described herein may be any of numerous different types of molecules, chemical compounds, or chemical structures that may be coupled to sensor 101 and that are complementary to an analyte 104, meaning that the binder 106 is capable of binding to, or otherwise sequestering an analyte 104 in a selective interaction. In some aspects, binders 106 and/or analytes 104 may be biomolecules, although this is not a requirement. In some aspects, binders 106 may be biomarkers, biomolecules, small molecule metabolites, cytokines, hormones, lipids, proteins, peptides, polypeptides, antibodies, aminated antibodies, aptamers, nucleic acids, chemical compounds, pharmaceutical compounds (e.g., drugs), sugars, acids, bases, and other entities that are "complementary" to a selected analyte, meaning that the binder is capable of binding to, or otherwise sequestering, the selected analyte 104 in a selective or specific manner. By way of example only, a single-stranded nucleic acid binder 106 can selectively bind with a nucleic acid analyte 104 that is complementary to the nucleic acid binder. Similarly, an antibody binder 106 may recognize and interact selectively or specifically with an epitope on a protein analyte 104. Other types of specific, complementary interactions between molecules, including biological molecules, are known to those of skill in the art.

In some embodiments, the presence or absence of one or more selected species of analyte 104 in a sample 107 may be determined, and in some aspects, the amounts of one or more of the selected species of analytes 104 may be quantified using the methods and system described herein. In some aspects, analyte 104 may be synthetically prepared in vitro. In some aspects, analyte 104 may be a molecule, a molecular compound, or an ionic compound. In some embodiments, analyte 104 may be an organic analyte. Exemplary organic analytes include antigens, proteins, peptides, polypeptides, oligopeptides, amino acids, polysaccharides, nucleic acids, DNA, and RNA. Additional exemplary analytes 104 include small molecule metabolites, cytokines, hormones, lipids, antibodies, sugars, acids, bases, pharmaceutical compounds (e.g., drugs), and other chemical compounds. In some aspects, analyte 104 may be a biomarker, a primary or secondary metabolite, an antibody, an aptamer, or a receptor. In some embodiments, analyte 104 may be a cell, a virus, a prion, a fungus, a bacterium, a parasite, a pathogen, or other organism, or a part of any of these, that can be selectively or specifically recognized and bound by a selected binder 106. In some aspects, analyte 104 may be a fragment of a cell or a cell structure, such as for example only, a region of a cell membrane, a fragment of a cell membrane, a liposome, or a cellular organelle such as a mitochondrion, a nucleus, a Golgi apparatus, or another subcellular structure.

In some embodiments, representative pathogens that may be an analyte 104 include, by way of example only, *Listeria monocytogenes, Escherichia coli, ECE coli,* Enteroviruses 68 & 71, *Salmonella enterica, Staphylococcus aureus,* and *Campylobacter* spp. In some aspects, a pathogen that is an analyte 104 may be a foodborne pathogen. Binders 106 such as antibodies and aptamers that specifically or selectively bind to any of a variety of pathogens are known in the art. In some aspects, aptamers may be particularly suitable for use as binders 106 to selectively detect nucleic acid analytes 104 from a variety of biological sources including pathogens.

In some embodiments, the presence and/or amount of one or more selected species of analytes 104 in a sample 107 may be indicative of a disease or condition, may correlate with the severity of a disease or condition, may be used to evaluate the response of a patient to a treatment for a disease or condition, or may be used to optimize treatment of a patient. The presence and/or amount of an analyte 104 in a sample 107 may also be examined to evaluate and correlate the analyte with pharmacokinetics and to adjust the treatment of a patient such as with a compound or drug. In some aspects of the invention, analyte 104 may be a metabolic by-product or breakdown product of a treatment compound, such as a drug.

In some embodiments, exposing sensor 101 to sample 107 comprises contacting sensor 101 with sample 107 under conditions that allow for a selected analyte 104 that may be present in sample 107 to selectively bind with binders 106 present in a functionalized dot 103. In some aspects, exposing sensor 101 to sample 107 comprises introducing a liquid sample into a sample chamber containing sensor 101. In some aspects, exposing sensor 101 to sample 107 may comprise placing sensor 101 in a liquid sample 107 or wiping sensor 101 on the surface of an object to be tested.

In some embodiments, sample 107 for analysis can be of any volume appropriate for the size of sensor 101 and cassette 113. In some aspects, sensor 101 may be exposed to sample 107, for example by incubating sample 107 with sensor 101 to expose functionalized dots 103 to sample 107) for a selected period of time under a selected set of physical, chemical, and environmental conditions that enable selective binding of analyte 104 with complementary binders 106 present in functionalized dot 103. Methods for evaluating the effectiveness of various types of parameters and conditions for enabling and enhancing selective binding of analyte 104 and binder 106 are generally known and routinely available to a person having ordinary skill in the art. In some aspects, to enhance selective or specific binding of analyte 104 with a selective binder 106 and to prevent or limit non-specific interactions, it may be necessary to adjust selected physical or chemical parameters of the sample 107 composition and/or exposure conditions. In some aspects, physical or chemical parameters may include, by way of example only, solution composition (e.g., sample buffer type, pH, salt concentration, and ionic strength), length of and temperature of sample 107 exposure to sensor 101, and number and composition of washes after sample 107 exposure to sensor 101. Methods for evaluating the effectiveness of these types of parameters and conditions for enhancing selective binding of analyte 104 and binder 106 are generally available to a person having ordinary skill in the art.

Figures 3A, 3B, 3C:
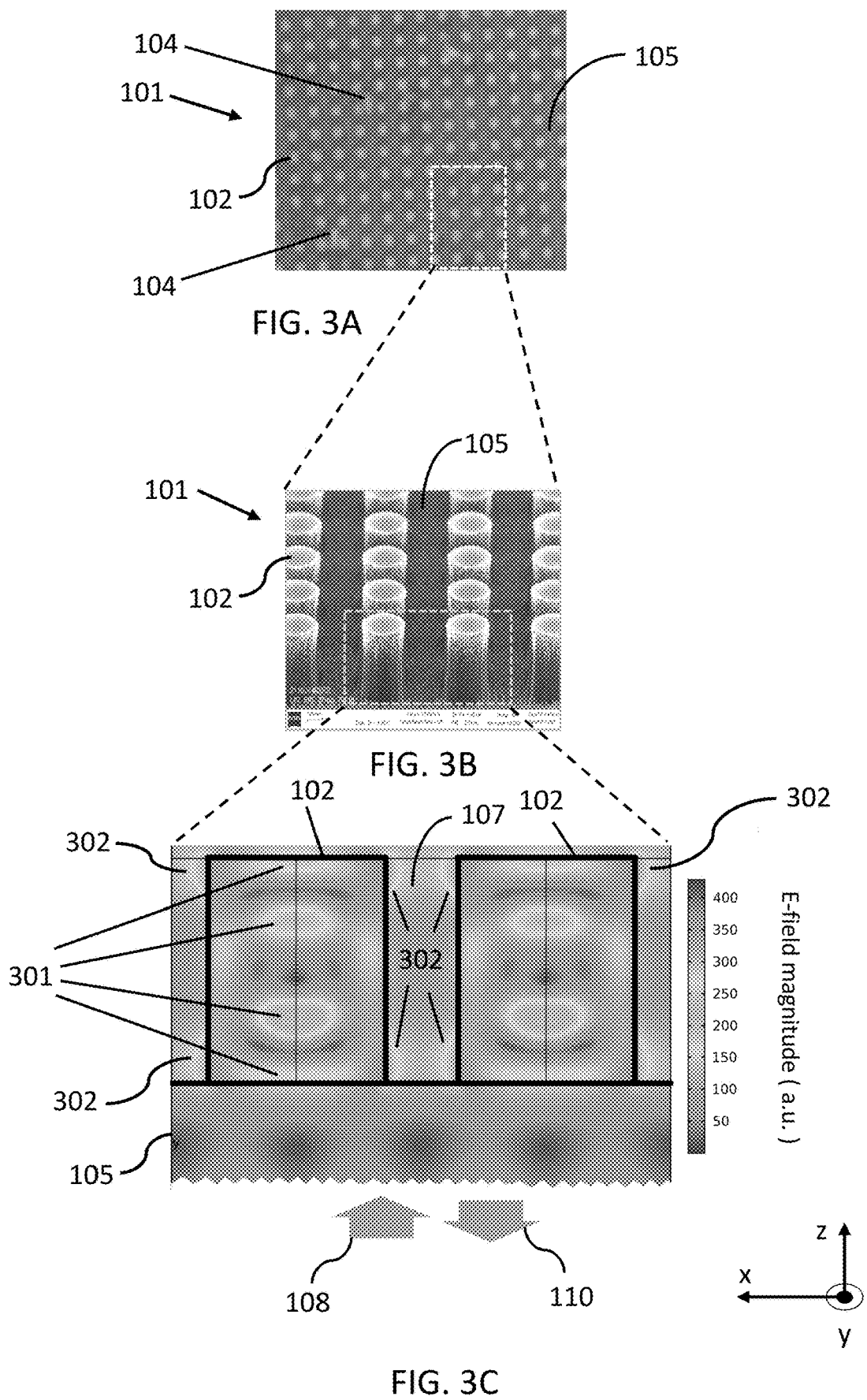
FIGS. 3A-C show an EM software simulation of input probe light propagation through one embodiment of an all-dielectric, metasurface sensor.

FIGS. 3A-C show an EM software simulation of input probe light 108 propagation through substrate 105 and nanopillars 102 and the interaction of the light's electric field (E-field) with sample 107 comprising a liquid medium and any nearby analytes 104. FIG. 3A is a top-down SEM image of a region of sensor 101 having analyte 104, bacteria cells in this simulation, bound to nanopillars 102 and/or substrate 105 near nanopillars 102. FIG. 3B is a higher magnification SEM image of a region of sensor 101 shown in FIG. 3A. FIG. 3C is an enlarged simulated side view of nanopillars 102 from FIG. 3B and shows a simulated resonant optical field on illumination with probe light 108.

Input probe light 108 propagates to and among nanopillars 102, producing a resonant standing wave, represented by standing wave peaks 301 inside nanopillars 102 (lighter regions inside the nanopillars in FIG. 3B). Analytes 104 that bind near the top or side walls of nanopillars 102 distort the evanescent E-fields 302 (lighter regions outside the nanopillars in FIG. 3C). In some aspects, upon analyte binding this local change in E-field resonance changes the relative phase 40 of the two orthogonal polarizations in reflected (as shown here) or transmitted output light 110 and increases output light 110 signal as a function of the amount of analyte 104 bound to binders 106. In some aspects quantification of analyte 104 may be correlated with intensity of light measured by polarization sensor 407.

Metasurface system 100 may be designed for operation in reflection mode or transmission mode. In reflection mode, probe light 108 may be reflected by dots 103 on sensor 101 back to the input plane as output light 110 (FIG. 4). In transmission mode, probe light 108 may transmit through sensor 101 exiting as output light 110 and on to an output plane on the opposite side of the sensor 101 (FIG. 5). For either mode, sensor 101 may be modeled, designed, and configured so as to optimize detection of a selected species of analyte 104 binding to selective binder 106. In many aspects, the EM simulation and modeling process for optimizing sensor 101 materials and dimensions typically may involve choosing and simulating one or more operating parameters, including one or more of operating wavelength ($\lambda$) of input probe light 108, sensor 101 materials composition, material composition of nanopillars 102, geometry and dimensions of nanopillars 102, mode of operation (transmission or reflection), polarization state of input probe light 108, sample 107 medium, analyte 104 dimension, and binder 106 dimension. In some embodiments, phase shifts of the polarization components $E_x$ and $E_y$ of the orthogonal axes and light intensities in output light 110 are primarily a function of $D_x$, and $D_y$ of nanopillars 102 or of $D_x$, $D_y$, and the operating wavelength $\lambda$ of probe light 108.

Exemplary EM Simulation and Modeling of a Sensor

One exemplary modeling, simulation, and design process to optimize metasurface sensor 101 for determining the presence of a selected analyte 104 in a sample 107 is presented here and uses electromagnetic (EM) simulation software. Numerous suitable EM simulation software systems are commercially available.

Operating wavelength $\lambda$ is the vacuum wavelength of input probe light 108 used for optically probing metasurface sensor 101. An acceptable range for $\lambda$ in a simulation may be selected based on practical considerations. For example, wavelengths of probe light 108 for use in the NIR region of the EM spectrum may be controlled and detected using relatively low-cost optics and electro-optics. An exemplary suitable wavelength range for NIR operation may be from about 900 nm to about 930 nm.

Sample 107 liquid medium for a simulation may be selected based on compatibility of the medium with analyte 104 and suitability for enabling selective binding of analyte 104 and binder 106. In some embodiments, it may be preferable that sample 107 medium have low light absorption at the operating wavelength $\lambda$. In one exemplary embodiment, sample 107 medium may be 8.5 g/L phosphate buffered saline (PBS) solution, similar to physiological saline.

Low-absorption, transparent, dielectric materials, such as the exemplary materials described herein, are selected for modeling nanopillars 102 and sensor substrate 105. In some embodiments, modeling may include evaluating one or more than one of nanopillar 102 compositions, geometry, configurations, and dimensions. In some aspects, nanopillars 102 and substrate 105 may be modeled as being made of the same material. However, in some aspects they may be modeled as being made of different materials. For example, nanopillar 102 material may be modeled as silicon and substrate 105 material as fused silica. In many aspects, at operating wavelength $\lambda$, nanopillar 102 material composition may be modeled as having a refractive index that is at least 1% higher than the refractive index of the sample 107 medium.

In many embodiments, nanopillars 102 useful for sensor 101 are configured to have an anisotropic cross-section geometry, such as for example an elliptical or rectangular cross-section having two orthogonal axes of bilateral symmetry, and an array of nanopillars 102 is periodic in both the x and y directions, with center-to-center period spacing, P. In some aspects, modeling may encompass selecting and evaluating a range of values for P spacing of nanopillars 102, such that P is less than the optical wavelength in the bulk test medium ($\lambda_m$) but greater than the wavelength ($\lambda_n$) in the material chosen for the nanopillars 102. Nanopillars 102 may be modeled as parallelepipeds with a rectangular cross-section having height H and two cross-section widths, $D_x$ and $D_y$. In some embodiments, other cross-sectional shapes that may be useful for anisotropic nanopillars 102 and that may be selected for modeling include cross-sections that are elliptical, cross-shaped, or rectangular with rounded corners. In some aspects, the choice of cross-sectional shape for anisotropic nanopillars 102 and for modeling may be made based on practical considerations, such as for example ease of fabrication. Nanopillars 102 having a range of values for H, $D_x$, and $D_y$ may be simulated during modeling. By way of example only, for parallelepiped nanopillars having a rectangular cross-section, a simulated range for H may be between $\lambda_n/20$ and $5\lambda_n$, and a simulated range for $D_x$ and $D_y$ may be between 0.01P and 0.99P. In some embodiments, smaller ranges may be selected based on practical considerations, such as microfabrication limitations.

In some embodiments, sensor 101 is modeled in two scenarios, (1) in the absence of analyte 104 and (2) in the presence of analyte 104.

In some embodiments, EM simulation software may be used to model sensor 101 as an array of nanopillars 102 positioned on substrate 105 and surrounded by sample 107 medium, and comprising dielectric materials and nanopillar 102 geometries selected as described herein. Input probe light 108 is simulated for each of the two orthogonal polarizations, $E_x$ and $E_y$. In many aspects, the polarization state of output light 110, the 40 and values for $E_x$ and $E_y$ light intensities may depend on any of a variety of the parameters listed above and herein. In many aspects, simulations may be performed using a variety of selected values and combinations of values for the parameters described above, e.g., λ, P, H, $D_x$, and $D_y$ to name a few. In some aspects, simulations may be performed using a variety of selected values and combinations of values for the three parameters λ, $D_x$, and $D_y$. EM simulation software may be used to model a metasurface sensor 101, in the absence of analyte 104 and in the presence of analyte 104, and data determined from the different simulations may be compared. In some aspects, optimal values for selected parameters such as λ, P, H, $D_x$, and $D_y$. may be determined for a specific application with one or more selected analytes 104 and one or more selected binders 106 by using EM simulation, computational modeling, and simulation software such as COMSOL to solve for Maxwell's equations of electromagnetic fields and to estimate the behavior of nanopillar 102 dimensions and geometries with a given input probe light 108.

Parameter values that maximize the impact of analyte 104 binding, with selective binders 106, on the optical resonance within each nanopillar 102 and consequently the shift in birefringence may be especially useful for sensor 101 and metasurface system 100. Using the simulations, a predicted difference in Δϕ, observed between simulations in the absence of analyte 104 and simulations in the presence of analyte 104, for the two orthogonal polarizations $E_x$ and $E_y$ of probe light 108 can be indicative of useful parameters for a metasurface sensor 101. In some aspects, a relatively larger predicted difference in Δϕ may be indicative of useful parameters that would provide a higher sensitivity of detection of analyte 104. In some aspects, for a modeled sensor 101, a difference in Δϕ, observed between simulations in the absence of analyte 104 and simulations in the presence of analyte 104, may be about 0.001 radians or in some aspects may be a value that is distinguishable from background noise within the system.

For reflection mode operation, the simulated intensity and phase of the electric field of output light 110 that is reflected back to the input plane after interaction with dots 103 in sensor 101 are determined. The simulation is performed for each of the two orthogonal polarizations, $E_x$ and $E_y$, of input probe light 108. The phase of the electric field of reflected output light 110 in each of $E_x$ and $E_y$ is determined relative to the phase of the input probe light 108. The 40 in the relative phase shifts for the two orthogonal polarizations of probe light 108 is of particular note.

For transmission mode operation, the simulated magnitude (intensity) and phase of the electric field of output light 110 that passes through sensor 101 after interaction with dots 103 in sensor 101 are determined. As for reflection mode operation, this simulation is performed for each of the two orthogonal polarizations, $E_x$ and $E_y$, of input probe light 108. The phase of the electric field of transmitted output light 110 in each of $E_x$ and $E_y$ is determined relative to the phase of the input probe light 108. The 40 in the relative phase shifts for the two orthogonal polarizations of probe light 108 is of particular note.

For the desired mode of operation, reflection or transmission, simulations in the absence of analyte 104 and data determination may be performed for each set of values, for example only, simulations may be performed for λ, P, H, $D_x$, and $D_y$ (and may include values of other selected parameters if any that may be of interest). The resulting data from the "no analyte 104" simulations (i.e., the simulated intensity and phase of the electric field of output light 110 and the 40 in the relative phase shifts for the two orthogonal polarizations $E_x$ and $E_y$ of probe light 108) represent baseline values for 40 and baseline values for $E_x$ and $E_y$ light intensities under the chosen conditions.

Using the same model, sensor 101 can be modeled in the second scenario, i.e., in the presence of one or more selected species of analyte 104, and the simulated intensity and phase of the electric field of output light 110 and the difference, Δϕ, in the relative phase shifts for the two orthogonal polarizations $E_x$ and $E_y$ of probe light 108 in the presence of the one or more analytes 104 species can be determined.

In some embodiments, simulations may be performed with analyte 104 being positioned in a variety of locations and orientations relative to nanopillars 102. For example, an analyte 104 may be modeled as being bound to binder 106 at the on top of a nanopillar 102, or straddling one or more nanopillars 102, or being bound to binder 106 nearer the base of one or more nanopillars 102, or vertically alongside one or more nanopillars 102. In many aspects simulations are performed as having sensor 101 being in a specific sample 107 medium. In some aspects, analyte 104 may be modeled as a three-dimensional (3-D) shape having a refractive index that differs from that of the sample 107 medium, at the selected wavelength of operation. In some aspects, analyte 104 modeling may be more complex. For example, analyte 104 may be modeled as comprising two or more structures each with a different refractive index.

Simulated data determined when sensor 101 is modeled in the presence of analyte 104 and in the absence of analyte 104 may be compared with one another for each set of values for λ, P, H, $D_x$, and $D_y$ (and, in some aspects, values of other selected parameters if any, that may also be of interest) and for any desired number of analyte 104 species and binding orientations of interest.

In many aspects, binding of analyte 104 to selective binders 106 may cause of change in how output light 110 is polarized as compared to how output light 110 is polarized in the absence of analyte 104 binding to selective binders 106. Statistical analyses of modeling data derived from comparisons of one or more simulations with analyte 104 and without analyte 104 can be useful for optimizing and selecting metasurface system 100 parameters, including but not limited to sensor 101 materials, configurations, and dimensions and input probe light 108 wavelengths for detecting a selected analyte 104 in sample 107 in a selected experimental situation. By way of example only, one statistical analysis may comprise constructing a figure of merit from the comparisons, and statistical analysis of the figure of merit can be used to select an optimal sensor 101 design. In some aspects, a figure of merit may combine the determined simulation results to quantitatively compare output light 110 intensities and Δϕs and identify metasurface system 100 and sensor 101 configurations for optimal analyte 104 detection. In some embodiments, a simulation using selected parameters described herein (including at least the nanopillar dimensions ($D_x$, and $D_y$) and wavelength λ of probe light 108), that results in a constructed figure of merit of greater than or equal to about 0.01 may be identified as being useful for detecting a selected analyte 104 with the simulated sensor 101.

In some aspects, a useful sensor 101 design may exhibit substantial change (D) in Δϕ in the same direction for most or all of the simulated analyte 104 binding scenarios as compared with simulations in the absence of analyte 104. In some aspects, a substantial change in Δϕ may be D>0.01 milliradians. Because, in general, a change (D) in Δϕ can be either negative or positive, the change may be easier to detect externally when most or all orientations of an added analyte 104 change Δϕ in the same direction, i.e., either a positive or a negative D value.

In some embodiments, a useful metasurface sensor 101 design may transfer a substantial portion of the intensity of the incident probe light 108 to output light 110 in many analyte binding scenarios, i.e., analyte 104 binding positions and orientations with respect to nanopillars 102. Intensity is typically proportional to the square of the magnitude of the electric field and may be measured for input probe light 108 in either orthogonal polarization. In some aspects, a substantial portion of intensity may refer to at least about 0.01% of input probe light 108 intensity. In some embodiments, a metric of intensity may be $P_m$, defined as the geometric mean of the output intensities (relative to the input intensities) for each of the two input probe light 108 polarizations (e.g., $E_x$ and $E_y$) in each of the analyte-presence and analyte-absence scenarios. In some embodiments, the figure of merit may be the product $P_m D$ or may be the product $P_m \sin(D)$.

In many embodiments, a useful sensor 101 configuration, composition, and operating wavelength exhibit one or more of the benefits described above for a plurality of analyte 104 binding orientation and positioning scenarios. For each set of values of λ, P, H, $D_x$, and $D_y$, a figure of merit constructed as above will have a statistical distribution for the different analyte 104 binding orientations and positions. In some embodiments, statistical analysis can yield, for example, a mean figure of merit for each set of values of λ, P, H, $D_x$, and $D_y$, and a mean that deviates most from zero may indicate an optimal set of values for λ, P, H, $D_x$, and $D_y$. As noted elsewhere herein, it should be appreciated that values for system 100 parameters other than λ, P, H, $D_x$, and $D_y$, may be used in modeling simulations.

By way of example, a metasurface sensor 101, for use in reflection mode with λ=1590 nm, was modeled using EM simulation with Si nanopillars 102 being on a fused silica substrate 105 and having P=1200 nm, H=1080 nm, $D_x$=850 nm, and $D_y$=620 nm. Simulations suggested a mean figure of merit of about 0.01 or higher for most analyte 104 binding scenarios.

In some embodiments, analyte 104 should be at least about λ/100 in its smallest dimension to be detectable. In some aspects, metasurface system 100 and sensor 101 modeling can be simulated with smaller component dimensions for operation with an approximately proportionally smaller λ, enabling detection of analytes 104 with smaller dimensions. In another example, using EM simulation, modeling a similar metasurface sensor 101 for operation in reflection mode with λ=915 nm, P=610 nm, H=670 nm, $D_x$=510 nm, and $D_y$=380 nm, yielded a mean figure of merit of about 0.01 or higher for most analyte 104 binding scenarios.

Figure 4B:
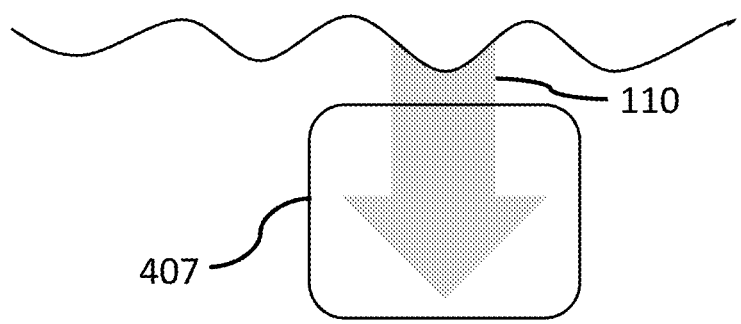

FIGS. 4A-B show a schematic side view of one embodiment of optical elements and data analysis components configured for use in reflection mode for detecting analyte 104 with sensor 101 using system 100 and methods described herein.

In some embodiments, probe light 108 source 401 may be a laser or a light-emitting diode (LED). In some aspects probe light 108 emitted by source 401 may be monochromatic light. However, in some aspects probe light 108 may be narrow-band light. In many embodiments, light is considered as being narrow-band when at least ~50%, at least ~60%, at least ~70%, at least ~80%, or at least ~90% of its power falls within a wavelength range having a width that is at most ~0.1% of the center wavelength of the range. In some aspects, this may be achieved by using an optional narrow bandpass spectral filter (not shown in this schematic representation), the filter being positioned between probe light 108 that is an LED and first polarizer 402. In some aspects, useful narrowband light sources may include super-luminescent LED and monochromators.

During operation, collimated input probe light 108 from source 401 may be linearly polarized using first polarizer 402, then steered toward the underside of metasurface substrate 105 by optional beamsplitter 403. An input waveplate 109 positioned immediately beneath metasurface substrate 105 of metasurface sensor 101 converts linearly polarized probe light 108 to circularly polarized light, which in some aspects may serve to minimize reflections from some dielectric surfaces not involved in analyte 104 binding. Input probe light 108 propagates to and among nanopillars 102 and within sample 107 medium. Reflected light 110 is reflected by metasurface sensor 101, passes through beamsplitter 403 and output analyzer 406, and is then detected and measured by polarization sensor 407.

In some embodiments, polarization sensor 407 (FIGS. 4A-B, FIGS. 5A-B) may comprise output analyzer 406 and focal plane array (FPA) 405, positioned such that output light 110 reflected by dot 103 is received by output analyzer 406. In many aspects, output analyzer 406 measures the polarization state $p_o$ of received output light 110, converts the polarization state $p_o$ of received output light 110 to an amount of light, and passes the amount of light to FPA 405. Light received by FPA 405, may then be converted to electrical signals and passed to computer instrumentation 408 for comparing the polarization state of output light 110 received at the output analyzer 406 with a baseline polarization state of light. In some aspects, FPA 405 images the light received from output polarizer 406 and passes the image data to computer instrumentation 408 for conversion to corresponding electrical signals.

In some embodiments, output analyzer 406 may be configured as a linear polarizer. In some aspects, polarization sensor 407 may be a commercially available, off-the-shelf polarization sensor. In many aspects, output analyzer 406 of polarization sensor 407 is positioned to receive output light 110 reflected or transmitted by dot 103 of sensor 101. In many aspects, output analyzer 406 may be positioned and configured for receiving output light 110, for measuring polarization states of output light 110, for converting the polarization state $p_o$ output light 110 to an amount of light, and for passing the output light 110 to FPA 405 for detecting and measuring the passed light. In some aspects, FPA 405 converts detected light received from analyzer to electrical signals, which are passed to computational instrumentation (computer hardware and software) 408 configured to receive and analyze electrical signals from FPA 405 and/or optional baseline detector 404 and to transduce the electrical signals to a quantitative measurement of the binding of analyte 104 to functionalized dots 103 on sensor 101, thereby determining the presence or absence of and/or quantifying the amount of selected analyte 104 bound to binders 106 in a functionalized dot 103.

In some embodiments, a change in the polarization state pox of output light 110 reflected by selected dot 103 (e.g., 103*a*) during exposure to a sample 107 lacking analyte 104 compared to the polarization state $p_{oA}$ of reflected output light 110 reflected by selected dot 103 (e.g., 103*a*) during exposure to sample 107 having analyte 104 (e.g., 104*a*) (and analyte 104 being bound to selective binder 106 (e.g., 106*a*) in dot 103*a*), may be indicative of the presence of analyte 104 in sample 107.

In some aspects, a change in polarization state of the reflected light 110 may be measured by another instrument such as for example an imaging polarimeter or a spot polarimeter that is spatially scanned across the metasurface sensor 101 using, for example, galvanometric scanning mirrors.

In some embodiments, an optional baseline detector 404 may be part of system 100 and may be useful for measuring fluctuations in input probe light 108 so as to increase accuracy of measurement by light sensor 405. To maintain high signal-to-noise ratio (SNR) and dynamic range, input waveplate 109 and output analyzer 406 may be aligned so as to extinguish unwanted, stray light that may be reflected by the bottom of substrate 105 and other interfaces. In some aspects, reflection mode operation may be useful for minimizing scatter and fluctuations that may be caused by turbidity of sample 107 medium.

In some embodiments, probe light 108 need not be circularly polarized but can instead be linearly polarized or elliptically polarized. By way of example, during reflection mode operation, input waveplate 109 or first polarizer 402 may be omitted from system 100, leaving probe light 108 polarization as either linear or elliptical, and optical probing comprises exposing metasurface sensor 101 to linearly or elliptically polarized probe light 108 from beneath metasurface substrate 105. The linear or elliptical polarization of input probe light 108 may be adjusted to have substantial intensity in both of the orthogonal axes $E_x$ and $E_y$ as defined by the geometry of sensor 101 and nanopillars 102, such that the reflected output light 110 exhibits measurable phase shifts in its two orthogonal components, while still providing adequate optical intensity for performing the necessary data determinations for both of the linear polarization components, $E_x$ and $E_y$, aligned with the geometric axes of sensor 101 (e.g., x and y axes).

In some embodiments, a method of determining the presence or absence of a selected analyte 104 in a test sample 107, may comprise exposing an all-dielectric, metasurface sensor 101 to the test sample 107, wherein the metasurface sensor 101 comprises at least one dot 103, the at least one dot 103 comprising anisotropic, subwavelength nanopillars 102 and being functionalized with binders 106 configured to bind selectively with the analyte 104; optically probing the metasurface sensor 101 with probe light 108 having an polarization state $p_i$; receiving at a polarization sensor 407, output light 110 reflected or transmitted by the at least one functionalized dot 103; measuring the polarization state of the output light 110 received at the polarization sensor 407; comparing the polarization state of the light received at the polarization sensor 407 with a baseline polarization state pox of output light 110; and, based on the comparison, determining the presence or absence of the analyte 104 in the test sample 107. In some aspects, a method may further comprise quantifying the amount of analyte 104 in the test sample 107 based on an amount of light received by polarization sensor 407. In some aspects, a method may further comprise quantifying the amount of the selected analyte 104 in the test sample 107.

In some embodiments, the baseline polarization state Pox may be determined by exposing a functionalized dot 103 on metasurface sensor 101 to a control sample 107 lacking the selected analyte 104; the dot 103 being functionalized with binders 106 selective for the selected specific analyte 104, optically probing sensor 101 with probe light 108 having the polarization state $p_i$; receiving at polarization sensor 407, output light 110 reflected or transmitted by the at least one functionalized dot 103; and, measuring the baseline polarization state $p_{oN}$ of the output light 110 received at polarization sensor 407.

In some aspects, a method may further comprise quantifying the amount of analyte 104 in the sample 107 based on an amount of light detected by light sensor 405.

In some embodiments, polarization sensor 407 may comprise output analyzer 406 and focal plane array (FPA) 405, positioned such that output light 110 reflected by dot 103 is received by output analyzer 406. In many aspects, output analyzer 406 measures the polarization state $p_o$ of received output light 110, converts the polarization state $p_o$ of received output light 110 to an amount of light, and passes the amount of light to FPA 405. Light received by FPA 405, may then be converted to electrical signals and passed to computer instrumentation for comparing the polarization state of output light 110 received at the output analyzer 406 to a baseline polarization state of light.

In some embodiments, the relevant polarization state of input light 108 or output light 110 (i.e., $p_i$, $p_o$, $p_{oN}$, $p_{oA}$) may be described by the determined 40 for the two orthogonal polarizations $E_x$ and $E_y$ of the light, the intensities of the light in $E_x$ and $E_y$, the degree of linear polarization (DoLP), and the angle of polarization (AoP) of the light. Examples may include linearly polarized light with a 45° AoP, linearly polarized light with a 0° AoP, elliptically polarized light with a 0.3 DoLP and a 45° AoP, or elliptically polarized light with a 0.2 DoLP and a 67° AoP.

In some embodiments, optically probing a sample 107 with input probe light 108 may result in the persistent reflection or transmission of output light 110, which can be measured continuously for a selected period of time without reduction in signal. The continuous sampling of output light 110, polarization state measurement of the output light 110, and comparison of the measured polarization state of output light 110 with a baseline polarization state pox may be useful for improving the sensitivity and accuracy of detection of analyte 104 in sample 107.

In some embodiments of the method, output analyzer 106 may be configured to block the passing of output light 110 having the baseline polarization state pox, and the presence or absence of analyte 104 in test sample 107 can be determined by detecting output light 110 passed by output analyzer 406 to FPA 405. In these aspects, the intensity of output light 110 incident on FPA 405 may correlate directly with the presence and quantity of selected analyte 104 bound to sensor 101 and therefore, the presence and quantity of selected analyte 104 in test sample 107.

In many aspects, computer instrumentation, i.e., computer hardware and software, 408 may be configured to receive and analyze images from polarization sensor 407, from FPA 405, and/or from optional baseline detector 404 and to transduce the images into electrical signals for determining a quantitative measurement of the binding of analyte 104 to functionalized dots 103 on sensor 101, thereby enabling a determination of the presence or absence of analyte 104 in sample 107 and quantification of the analyte 104 in sample 107. In some aspects, signal values from sensor 405 that are representative of analyte binding in one or more dots 103 may be normalized by signal values from baseline detector 404.

In some embodiments, such as when sensor 101 is configured with a plurality of differently functionalized dots 103 for multiplex detection of a plurality of different species of analyte 104, reflected or transmitted output light 110 from each functionalized dot 103 is typically received and detected separately by FPA 405. In many aspects, FPA 405 produces an image that is processed by computer instrumentation 408 to produce a signal for each functionalized dot 103. The image may be divided into regions corresponding to each dot 103. The signal for each dot 103 may be computed by summing the pixel values and summing the pixel values within each dot region.

In this manner, binding of each different selected species of analyte 104, to selective binders 106 that bind selectively with a selected species of analyte 104 in the corresponding dot 103 can be determined and analyzed separately and simultaneously. Output light 110 reflected or transmitted by each functionalized dot 103 can be converted to electronic data for computational processing to determine the presence or absence of each species of analyte 104 in sample 107 and to quantify the amount of each analyte 104 species in sample 107.

In some embodiments, probing a sample 107 with input probe light 108 may result in the persistent reflection or transmission of output light 110, which can be monitored continuously for a selected period of time without reduction in signal. The continuous sampling of data may be useful for improving the sensitivity and accuracy of detection of analyte 104 in sample 107.

In some embodiments, output analyzer 406 may be configured to block reflected or transmitted output light 110 that has the polarization state $p_{oN}$, i.e., the baseline polarization state of output light 110 in the absence of analyte. In these embodiments, only transmitted or reflected output light 110 that has a polarization state $p_o$ that differs from pox may be detected by sensor 405 that is an FPA sensor. In some aspects then, the detection of light by FPA 405 may be indicative of the presence of a selected analyte 104 in a sample 107. In these aspects, the intensity of light incident on sensor 405 may correlate directly with the quantity of analyte 104 that binds to metasurface sensor 101.

FIG. 5 is a schematic side view of one exemplary embodiment of system 100, including optical elements and data analysis components configured for use in transmission mode for detecting a selected analyte 104 with sensor 101. Beamsplitter 403 is not present in this exemplary embodiment. Input probe light source 401 is positioned above metasurface sensor 101. During operation, collimated input probe light 108 from source 401 is directed downward to metasurface sensor 101 and is linearly polarized using first polarizer 402 and continues toward the sample 107 medium, passing first through input waveplate 109 (positioned immediately above (before) sensor 101), which converts linearly polarized input probe light 108 to circularly polarized light. Input probe light 108 propagates to and within sample 107 medium and among nanopillars 102 and exits the sensor through substrate 105 from the opposing side of metasurface sensor 101 as transmitted output light 110. As for the reflection mode embodiment shown in FIG. 4, transmitted output light 110 passes through output analyzer 406, which in some aspects may be a linear polarizer, and is then detected and measured by sensor 405, which in some aspects, may be a FPA. In some aspects, polarization sensor 407 may be a commercially available, off-the-shelf polarization sensor 407. In this exemplary embodiment, a change in the 40 of transmitted output light 110 caused by selected analyte 104 binding to selective binders 106 near or on nanopillars 102 may produce a change in the polarization state of transmitted output light 110 and, when output analyzer 106 is a linear polarizer, this can result in a change in the intensity of output light 110 at FPA 405. When no analyte 104 is bound to selective binders 106 in functionalized dot 103, transmitted output light 110 has a baseline polarization state designated pox. When analyte 104 is bound to binders in dot 103, transmitted output light 110 may have a second, different polarization state, $p_{oA}$. A detectable difference in polarization states of $p_{oA}$ vs $p_{oN}$ may be indicative of the presence of analyte 104 in sample 107.

In some embodiments input waveplate 109 and/or first polarizer 402 may be omitted from system 100, leaving probe light 108 polarization as either linear or elliptical, and optical probing comprises exposing sensor 101 to linearly or elliptically polarized probe light 108 from above sensor 101. The linear or elliptical polarization of input probe light 108 may be adjusted to have substantial intensity in both of the orthogonal axes $E_x$ and $E_y$, as defined by the geometry of sensor 101 and nanopillars 102, such that the transmitted output light 110 exhibits measurable phase shifts in its two orthogonal components, while still providing adequate optical intensity for performing the necessary data determinations for both of the linear polarization components, $E_x$ and $E_y$, aligned with the geometric axes of sensor 101 (e.g., x and y axes).

Exemplary Detection and Quantification of Bacteria Analyte

In an exemplary embodiment, selected sensor 101 parameters were simulated and sensor 101 was modeled as described herein. Based on the results of the modeling, optimal sensor 101 parameters and experimental conditions were selected for sensor 101 fabrication and analyte 104 detection. Dots 103 in sensor 101 were functionalized with anti-*Listeria monocytogenes* antibody (LGC SeraCare, Milford, Mass.) as binders 106 using a drop casting method. Briefly, dried anti-*Listeria monocytogenes* antibody was rehydrated in sterile PBS and a drop placed on a freshly silanized metasurface chip and allowed to dry. A sample 107 of analyte 104, i.e., heat-killed *Listeria monocytogenes* cells (LGC SeraCare) were prepared in PBS (~8.5 g NaCl/L, similar to human physiological saline). Sample 107 was dropped onto functionalized metasurface sensor 101. Metasurface sensor 101 was placed in cassette 113 in an orientation that minimized aberrant light reflection from non-functionalized regions and analyzed with reader 111. A digital scope produced real-time measurements of analyte 104 (heat-killed *L. monocytogenes* cells) binding to functionalized dots 103 by normalizing measured current from sensor 405 with current from baseline detector 404.

Bacterial spread plate counts of samples containing viable *Listeria monocytogenes* cells were used to calibrate system 100 and to measure the limit of detection LoD of analyte 104 (heat-killed *L. monocytogenes* cells). The normalized metasurface sensor 101 response to a known concentration of analyte 104 bacteria was compared with system noise to estimate a concentration that would produce a SNR of 1:1, which represents a practical LoD. For example, a 107 CFU/mL concentration of bacterial analyte 104 produced a normalized signal of 0.84. In the absence of bacterial analyte 104, the measured noise had a standard deviation of 3.8× $10^{-4}$, giving SNR=2230. Therefore, the LoD was about 4,000 CFU/ml. In some aspects, the LoD may be reduced to about 50 CFU/mL, or less, by increasing the intensity of input probe light 108 for probing sensor 101, which may function to increase the SNR of measured signals. In some aspects, noise sources may include detection noise, digitization noise, scattered stray light, nonuniformities in the functionalization of the metasurface, and fluctuations in the wavelength, power, and polarization of the light source. The noise floor can be characterized by measuring the power of the detected signal when no analyte 104 is present.

After simulating many possible designs in Phase I, the nanopillar widths ($D_x$ and $D_y$) and the height H were carefully chosen using rigorous electromagnetic (EM) simulation to maximize the impact of pathogen (analyte 104)

binding on the optical resonance within each nanopillar and consequently the shift in birefringence.

What is claimed is:

1. A method of determining the presence or absence of a selected analyte in a test sample, the method comprising:
    exposing an all-dielectric, metasurface sensor to the test sample, wherein the all-dielectric metasurface sensor comprises a local dielectric metasurface substrate and at least one dot positioned on the metasurface substrate, the at least one dot comprising anisotropic, subwavelength nanopillars and being functionalized with binders configured to bind selectively with the analyte, wherein the anisotropic, subwavelength nanopillars are dielectric;
    optically probing the all-dielectric metasurface sensor with light having a polarization state pi;
    receiving at a polarization sensor, light reflected or transmitted by the at least one dot;
    measuring the polarization state of light received at the polarization sensor based on a polarization analysis;
    comparing the polarization state of the light received at the polarization sensor with a baseline polarization state of light; and,
    based on the comparison, determining the presence or absence of the selected analyte in the test sample.

2. The method of claim 1, wherein the baseline polarization state of light is determined by a method comprising:
    exposing the all-dielectric metasurface sensor to a control sample lacking the selected analyte; optically probing the all-dielectric metasurface sensor with light having the polarization state pi; receiving at the polarization sensor, light reflected or transmitted by the at least one dot; and,
    measuring the polarization state of light received at the polarization sensor.

3. The method of claim 1, further comprise quantifying the amount of the selected analyte in the test sample.

4. The method of claim 1, wherein the polarization sensor comprises an output analyzer and a focal plane array;
    and wherein, the light received at the polarization sensor is received by the output analyzer and the polarization state of the light received by the output analyzer is measured and converted to an amount of light, and the amount of light is passed to the focal plane array; and,
    comparing the light received by the focal plane array with the baseline polarization state of light.

5. The method of claim 1, wherein the polarization state Pi is circularly, linearly, or elliptically polarized.

6. A method for identifying an all-dielectric, metasurface sensor useful for detecting the presence or absence of a selected analyte in a test sample according to the method of claim 1, the method comprising:
    selecting parameters of the all-dielectric metasurface sensor, the parameters including at least a Dx and a Dy of the anisotropic, subwavelength nanopillars and the wavelength λ of the light having the polarization state pi, wherein the anisotropic, subwavelength nanopillars are positioned on a local metasurface substrate;
    computationally performing electromagnetic simulations using the selected parameters to identify a plurality of metasurface sensor models;
    based on the electromagnetic simulations, determining a figure of merit for each metasurface sensor model in the plurality of models; and,
    identifying a modeled, all-dielectric metasurface sensor having a figure of merit greater than or equal to about 0.01 as being useful for detecting the presence or absence of the selected analyte in the test sample.

7. The method of claim 6 wherein, the selected parameters further include one or both of the periodicity P and height H of the anisotropic, subwavelength nanopillars.

8. The method of claim 6, wherein the selected parameters further include one or more of the periodicity of the anisotropic subwavelength nanopillars, the height of the anisotropic subwavelength nanopillars, metasurface sensor composition, test sample composition, the identity of the pi; analyte dimensions, binder dimensions, and mode of metasurface sensor operation.

9. The method of claim 1, wherein the anisotropic subwavelength nanopillars have an elliptical or rectangular cross-section.

10. The method of claim 1, wherein the light is incident on the metasurface substrate.

11. A method of determining the presence or absence of a selected analyte in a test sample, the method comprising:
    exposing an all-dielectric, metasurface sensor to the test sample, wherein the all-dielectric sensor comprises a local metasurface substrate and at least one dot positioned on the local metasurface substrate, the at least one dot comprising anisotropic, subwavelength nanopillars and being functionalized with binders configured to bind selectively with the analyte;
    optically probing the all-dielectric metasurface sensor with light having a polarization state pi;
    receiving at an output analyzer, light reflected or transmitted by the at least one dot, wherein the output analyzer is configured to block light having a baseline polarization state, wherein the polarization axis of the output analyzer is oriented by at least ±5° relative to the baseline polarization state;
    passing light having a polarization state different from the baseline polarization state to a focal plane array;
    detecting light received at the focal plane array; and,
    determining the presence or absence of the selected analyte in the test sample based on detection of light by the focal plane array.

* * * * *